United States Patent
Yamashita et al.

(10) Patent No.: US 6,879,433 B1
(45) Date of Patent: Apr. 12, 2005

(54) WAVELENGTH CONVERSION APPARATUS

(75) Inventors: Shinji Yamashita, Tokyo (JP); Kenichi Torii, Tokyo (JP)

(73) Assignee: Japan Science and Technology Agency (JP)

( * ) Notice: Subject to any disclaimer, the term of this patent is extended or adjusted under 35 U.S.C. 154(b) by 126 days.

(21) Appl. No.: 10/332,028
(22) PCT Filed: Oct. 3, 2000
(86) PCT No.: PCT/JP00/06867
§ 371 (c)(1), (2), (4) Date: Jun. 10, 2003
(87) PCT Pub. No.: WO02/03132
PCT Pub. Date: Jan. 10, 2002

(30) Foreign Application Priority Data

Jul. 4, 2000 (JP) ........................................ 2000-202859

(51) Int. Cl.[7] .............................. G02F 2/02; G02F 1/35; G02B 6/00
(52) U.S. Cl. ......................... 359/332; 359/326; 385/122
(58) Field of Search ................................. 359/332, 326; 385/24, 122, 123

(56) References Cited

U.S. PATENT DOCUMENTS 5,386,314 A 1/1995 Jopson ........................ 359/326
6,307,984 B1 * 10/2001 Watanabe ..................... 385/24

FOREIGN PATENT DOCUMENTS

EP 0 862 078 A1 9/1998 ............. G02F/1/35
EP 1306718 A1 * 5/2003 ............. G02F/1/35

OTHER PUBLICATIONS

International Application PCT/JP00/06867 filed Oct. 3, 2000, International Publication No. WO 02/03132 A1 published Jan. 10, 2002.

PCT International Search Report of International Application PCT/JP00/06867 filed Oct. 3, 2000, International Publication No. WO 02/03132 A1 published Jan. 10, 2002.

Abstract: Japanese Publication No. 08–095093 published Apr. 12, 1996, Japanese Application No. 06–230018, filed Sep. 26, 1994, of Nippon Telegr & Teleph Corp, inventor Inoue Yasushi, pertains to Wave Length Conversion Device.

Publication: "*Design Of Highly Efficient Four–Wave Mixing Devices Using Optical Fibers*" by Kazuro Kikuchi and Chaloemphon Lorattanasane of Department of Electronic Engineering, University of Tokyo, Tokyo Japan, published by *IEEE Photonics Technology Letters*, vol. 6, No. 8 Aug. 1994.

Publication: "*Interband Wavelength Conversion of 320 Gb/s (32×10 Gb/s) WDM Signal Using A Polarization–Insensitive Fiber Four–Wave Mixer*" by Shigeki Watanabe, Shinichi Takeda and Terumi Chikama of Fujitsu Laboratories, Ltd., Kawaski, Japan, published by *ECOC 98*, Sep. 20–24, 1998, Madrid, Spain.

* cited by examiner

*Primary Examiner*—David N. Spector
(74) *Attorney, Agent, or Firm*—Welsh & Katz, Ltd.; Thomas W. Tolpin

(57) ABSTRACT

A wavelength converter which employs an optical fiber and has high converter efficiency. The polarization planes of a signal light and an exciting light outputted from a laser diode (LD) (103) are respectively controlled by polarization controllers (PC's) (101 and 104) and the phases of the lights are respectively modulated by phase modulators (PM's) (102 and 105) in accordance with modulation signals outputted form an oscillator (110). Then, the output lights form the PM's (102 and 105) are multiplexed by a coupler (106). After the multiplexed signal light and exciting light are amplified by an optical amplifier (EDFA) (107), they are imputed to a dispersion shift fiber (DSP) (108). After wavelength transformation (four light waves mixing (FWM) is practiced in the DSP, and FWM light is outputted through a band-pass filter (BPF) (109).

18 Claims, 15 Drawing Sheets

(a) in case that no phase modulation is performed (b) in case that only pumping light is phase-modulated (c) in case that both pumping light and signal light are phase-modulated (a) in case that pumping light is phase-modulated (b) in case that pumping light is phase-modulated

WAVELENGTH CONVERSION APPARATUS

CROSS REFERENCES TO RELATED APPLICATIONS

This application is based upon priority International Application PCT/JP00/06867 filed Oct. 3, 2000, International Publication No. WO 02/03132 A1 published Jan. 10, 2002, which is based upon Japanese Application 2000-202859 filed Jul. 4, 2000.

FIELD OF THE INVENTION

The present invention is related to a wavelength conversion apparatus, and more specifically, to an optical fiber wavelength conversion apparatus having a high conversion efficiency.

BACKGROUND OF THE INVENTION

All optical type wavelength converters are very important devices used to construct advanced wavelength division multiplexing (WDM) networks with flexibility in the future. A specific attention has been paid to wavelength conversion operations using four-wave mixing (FWM) operations within optical fibers, since the wavelength conversion techniques can own very broad wavelength conversion bands, and also can convert multi-channel WDM signals in a batch-manner. The wavelength conversions using the four-wave mixing (FWM) operations within the optical fibers own very wide wavelength conversion bands and can convert wavelength division multiplexing signals for multiple channels in the batch mode. It is, therefore, desirable to provide an improved wavelength converter.

BRIEF SUMMARY OF THE INVENTION

An improved wavelength converter (wavelength conversion apparatus) is provided herein. Generally speaking, in order to increase a conversion efficiency by FWM operation, it is effective to increase pumping light power. However, an upper limit value of injection power of pumping light would be limited by the stimulated brillouin scattering (SBS) phenomenon occurred in optical fibers. As one of methods for suppressing the SBS, a spread spectrum technique based upon a frequency modulation, or a phase modulation may be available. There is described that the FWM efficiency can be actually improved by this spread spectrum technique.

However in the case that the spread spectrum technique is employed, since spectra of pumping light are widened, spectra of signals whose wavelengths are converted are furthermore widened, and are largely influenced by dispersion of optical fibers.

The present invention has been made to solve the above-described problems, and therefore, has an object to provide a wavelength conversion apparatus whose conversion efficiency is high with employment of optical fibers. In particular, the present invention owns an object capable of obtaining such an FWM light having a less broadened spectrum by also phase-modulating signal light at the same frequency, while a stimulated Brillouin scattering phenomenon is suppressed by way of either a phase modulating operation or a frequency modulating operation of pumping light.

A first solving means of the present invention is to provide a wavelength conversion apparatus comprising:
  an oscillator for outputting a modulation signal;
  a first modulator for entering thereinto signal light, and for modulating the signal light based upon the modulation signal outputted from the oscillator;
  a second modulator for entering thereinto pumping light, and for modulating the pumping light based upon the modulation signal outputted from the oscillator;
  a multiplexer for multiplexing the output from the first modulator with the output from said second modulator; and
  an optical fiber for entering thereinto the output of the multiplexer, and for outputting an optical signal, the wavelength of which is converted by a four-wave mixing operation.

A second solving means of the present invention is to provide a wavelength conversion apparatus comprising:
  an oscillator for outputting a modulation signal;
  a first modulator for entering thereinto pumping light, and for modulating the pumping light based upon the modulation signal outputted from the oscillator;
  a multiplexer for multiplexing the output from the first modulator with signal light;
  an optical fiber for entering thereinto the output of the multiplexer, and for outputting an optical signal, the wavelength of which is converted by a four-wave mixing operation; and
  a second modulator for entering thereinto the output from the optical fiber, and for modulating the four-wave-mixed light based upon the modulation signal outputted from the oscillator.

A third solving means of the present invention is to provide a wavelength conversion apparatus comprising:
  an oscillator for outputting a modulation signal;
  a modulator for entering thereinto signal light, and for modulating the signal light based upon the modulation signal outputted from the oscillator;
  a light emitting unit for outputting pumping light which is modulated based upon the modulation signal outputted from the oscillator;
  a multiplexer for multiplexing the output from the modulator with the output from the light emitting unit; and
  an optical fiber for entering thereinto the output of the multiplexer, and for outputting an optical signal, the wavelength of which is converted by a four-wave mixing operation.

A fourth solving means of the present invention is to provide a wavelength conversion apparatus comprising:
  an oscillator for outputting a modulation signal;
  a reflector for reflecting thereon signal light;
  a multiplexer for multiplexing signal light, the signal light reflected from said reflector, and pumping light with each other;
  a modulator for inputting thereinto the signal light along a first direction and modulating the signal light based upon the modulation signal outputted from the oscillator, and also for inputting thereinto the mulitplexed light derived from the multiplexer along a second direction and modulating both the pumping light and the modulated signal light based upon the modulation signal outputted from the oscillator; and
  an optical fiber for entering thereinto the output of the modulator, and for outputting an optical signal, the wavelength of which is converted by a four-wave mixing operation.

A fifth solving means of the present invention is to provide a wavelength conversion apparatus comprising:
  an oscillator for outputting a modulation signal;
  a polarization beam splitter for splitting entered signal light into both a first polarized wave and a second polarized wave, and for multiplexing an entered third polarized wave with an entered four polarized wave;

a modulator for inputting thereinto the first polarized wave derived from the polarization beam splitter and modulating the first polarized wave based upon the modulation signal outputted from the oscillator so as to output the modulated first polarized wave as the third polarized wave, and also for inputting the second polarized wave derived from the polarization beam splitter along a direction opposite to that of the first polarized wave and modulating the second polarized wave based upon the modulation signal outputted from the oscillator so as to output the modulated second polarized wave as the fourth polarized wave;

a 90-degree twisting unit for twisting by 90-degrees both a polarization plane of the first polarized wave derived from the polarization beam splitter and a polarization plane of the fourth polarized wave derived from the modulator, and a polarization independent optical fiber four-wave mixing element for entering thereinto the output from the polarization beam splitter, and for outputting an optical signal, the wavelength of which is converted independently from the polarization.

A sixth solving means of the present invention is to provide a wavelength conversion apparatus comprising:

an oscillator for outputting a modulation signal;

a first modulator for entering thereinto first pumping light, and for modulating the first pumping light based upon the modulation signal outputted from the oscillator;

a second modulator for entering thereinto second pumping light, and for modulating the second pumping light based upon the modulation signal outputted from the oscillator;

a polarization beam splitter for multiplexing a polarized wave of the output from the first modulator with a polarized wave of the output from the second modulator in such a manner that the polarized planes are orthogonal to each other;

a multiplexer for multiplexing signal light with the output from the polarization beam splitter; and an optical fiber for entering thereinto the output of the multiplexer, and for outputting an optical signal, the wavelength of which is converted by a four-wave mixing operation.

A seventh solving means of the present invention is to provide a wavelength conversion apparatus comprising:

an oscillator for outputting a modulation signal;

a first light emitting unit for outputting first pumping light which is modulated based upon the modulation signal outputted from the oscillator;

a second light emitting unit for outputting second pumping light which is modulated based upon the modulation signal outputted from the oscillator;

a polarization beam splitter for multiplexing a polarized wave of the output from the first light emitting unit with a polarized wave of the output from the second light emitting unit in such a manner that the polarized planes are orthogonal to each other;

a multiplexer for multiplexing signal light with the output from the polarization beam splitter; and an optical fiber for entering thereinto the output of the multiplexer, and for outputting an optical signal, the wavelength of which is converted by a four-wave mixing operation.

A more detailed explanation of the invention is provided in the following description and appended claims take in conjunction with the accompanying drawings.

DETAILED DESCRIPTION OF THE INVENTION

A detailed description of the preferred embodiments and best modes are described therein.

(1) Four-Wave Mixing Operation

First, a description is made of four-wave mixing (FWM) operation. Polarization "P" occurred in an optical fiber may be expressed by the following formula (1), while being divided into a linear term "$P_L$" which is directly proportional to an electric field "E", and a non-linear term "$P_{NL}$":

$$P = P_L + P_{NL} \quad (1)$$

Among these terms, the non-linear polarization $P_{NL}$ may be written by employing electric susceptibilities $\chi^{(2)}$, $\chi^{(3)}$ and the like:

$$P_{NL} = P^{(2)} + P^{(3)} + \ldots$$

$$= \epsilon_0 \chi^{(2)} EE = \epsilon_{01} \chi^{(3)} EEE = \quad (2)$$

In this formula, symbol "$\epsilon_0$" shows a vacuum permittivity, and symbol $P_{(n)}$ represents nth order non-linear polarization.

In the non-linear polarization expressed by the formula (2), a 2nd order non-linear polarization of a first term in a right hand does not occur in the optical fiber. On the other hand, 3rd order non-linear polarization of the 2nd term appears in all of substances. In general, when three sets of light having angular frequencies $\omega_i$, $\omega_j$, $\omega_k$ are entered into an optical fiber, these three sets of light produce via this 3rd order non-linear polarization fourth light which is expressed by the following formula (3). This phenomenon is referred to be "four-wave mixing" (FWM) operation:

$$\omega_{ijk}=\omega_i=\omega^j-\omega_k \quad (3)$$

Figure 1:
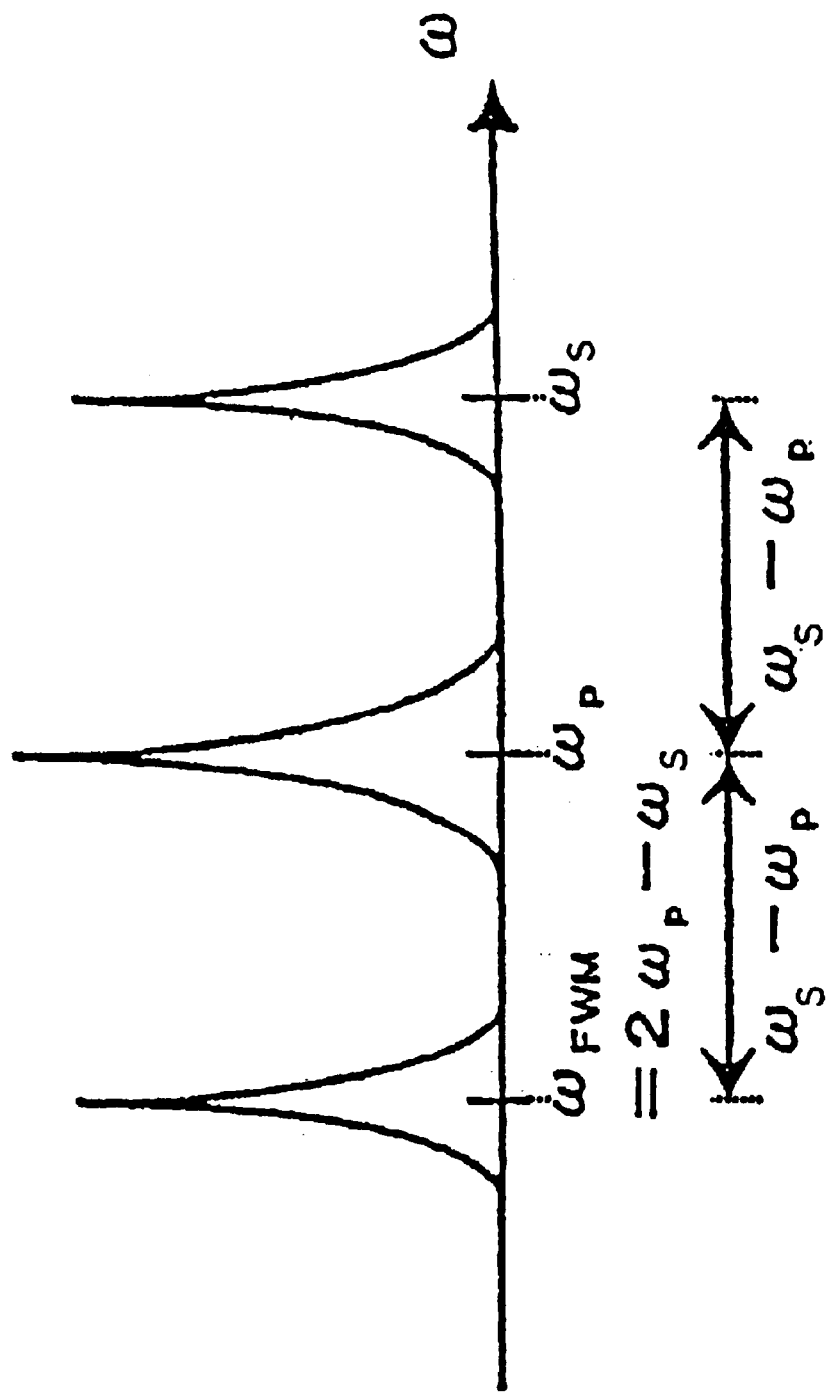
FIG. 1 is an explanatory diagram for explaining an angular frequency of FWM light.

In this case, FIG. 1 shows an explanatory diagram for explaining an angular frequency of an FWM operation. The light having such an angular frequency, which has been degenerated as "$\omega_i=\omega_j$" in the above-explained formula, is employed as pumping light. That is to say, it becomes "$\omega_{ijk}=2\omega_j-\omega_k$". Now, assuming that "$\omega_j$" indicates an angular frequency "$\omega_p$" of pumping light, and "$\omega_k$" shows an angular frequency "$\omega_s$" of signal light, an angular frequency "$\omega_{FWM}$" of fourth light produced by the FWM operation is given by the following formula:

$$\omega_{FWM}=2\omega_p-\omega_s \quad (4)$$

In this case, as indicated in FIG. 1, the angular frequency "$\omega_{FWM}$" of the light which is newly produced by the four-wave mixing (FWM) operation corresponds to such an angular frequency that the spectrum of the angular frequency $\omega_s$ of the signal light is inverted on a frequency (wavelength) axis, while the angular frequency "$\omega_p$" of the pumping light is located as a center. At this time, an efficiency of the four-wave mixing (FWM) operation is directly proportional to a square of power of the pumping light. As a consequence, in order to achieve a high conversion efficiency, it is effective to increase the power of the pumping light. Also, a conversion efficiency also depends upon a relative polarization state (condition) between pumping light and signal light. If the polarization state of the pumping light is equal to that of the signal light, then the conversion efficiency becomes maximum. If the polarization state of the pumping light is orthogonal to that of the signal light, then the conversion efficiency becomes zero.

In general, if an optical electric field "$E_s$" of signal light and an optical electric field "$E_p$" of pumping light are defined by the following formulae (5) and (6), then an electric field "$E_f$" of FWM light is given by the below-mentioned formula (7), while symbol "k" is used as a proportional constant:

$$E_s=E_{S0}\exp j\,(\omega_p t+\phi_p) \quad (5)$$

$$E_p=E_{p0}\exp j\,(\omega_p t+\phi_p) \quad (6)$$

$$E_f=kE_s{}^*E_p{}^2=kE_{s0}{}^*E_{p0}{}^2\exp j[(2\omega_p-\omega_s)t+(2\phi_p-\phi_s)] \quad (7)$$

In this case, in order to suppress the SBS phenomenon, if the pumping light is phase-modulated based upon an angular frequency "$\omega_m$" and a modulation index "$m_p$", then it becomes:

$$\phi_p=m_p\cos\omega_m t \quad (8)$$

As a result, the FWM light is phase-modulated based upon a modulation index "2 m", so that a spectrum is largely widened.

(2) First Embodiment

Figure 2:
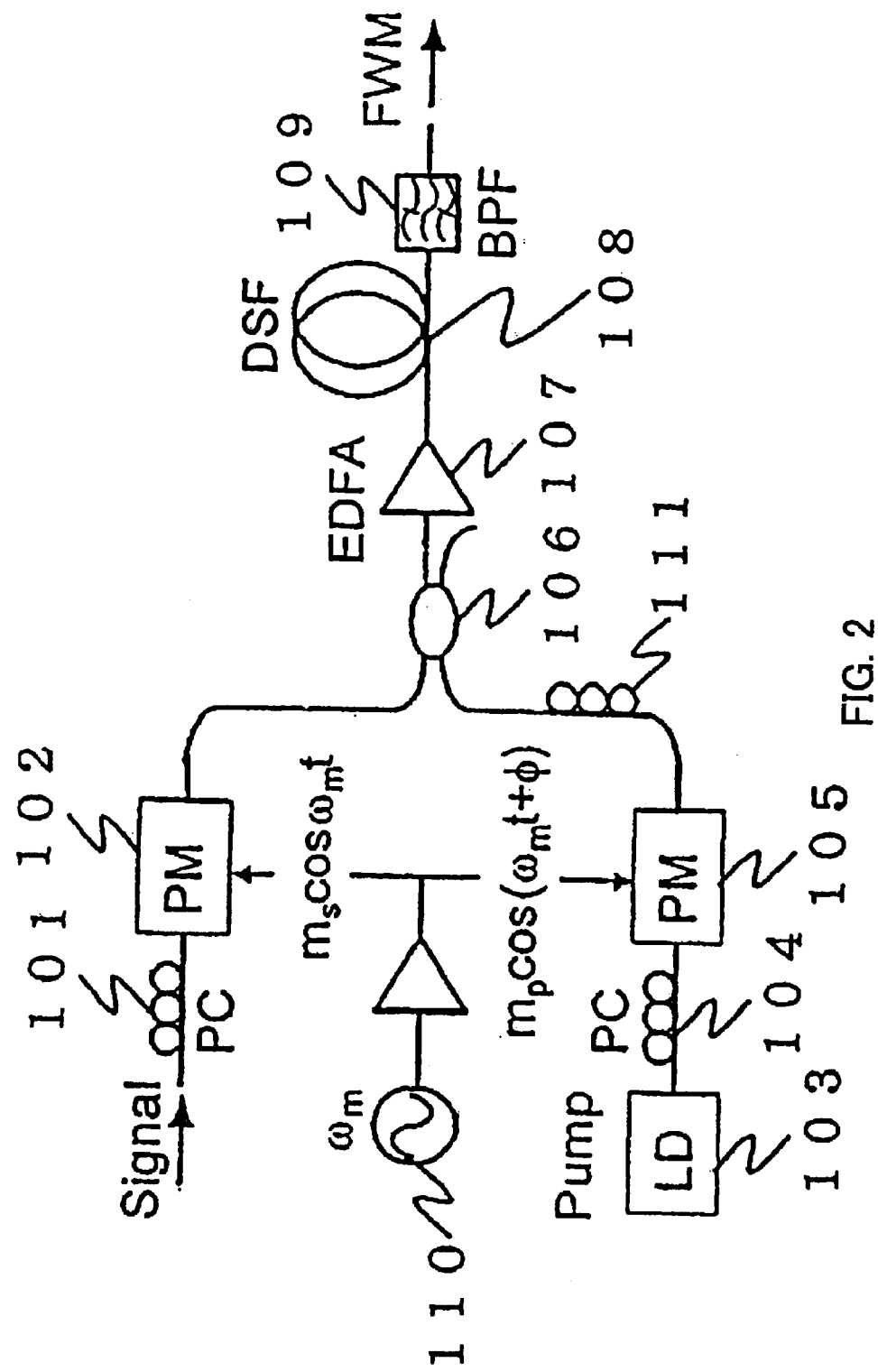
FIG. 2 is a structural diagram for showing that both signal light and pumping light are phase-modulated.

FIG. 2 is a structural diagram for showing a wavelength conversion apparatus according to a first embodiment mode of the present invention. This drawing shows an arrangement in which both signal light and pumping light are phase-modulated. The wavelength conversion apparatus of this embodiment mode is provided with polarization controllers (PCs) 101, 104, 111; phase modulators (PMs) 102, 105; a laser diode (LD) 103; a coupler 106; an Eribuim-doped fiber amplifier (EDFA) 107; a dispersion-shifted fiber (DSF) 108; a band-pass filter (BPF) 109; and an oscillator 110.

The laser diode (LD) 103 is a light emitting unit for outputting pumping light (Pump). The polarization controllers (PCs) 101, 104, and 111 control polarization planes of input light. The oscillator 110 outputs a modulation signal. The phase modulators (PMs) 102 and 105 phase-modulate signal light (Signal) and pumping light (Pump) based upon the modulation signal outputted from the oscillator 110, respectively. The coupler 106 multiplexes input light. The Erbium-doped fiber amplifier (EDFA) 107 amplifies input light and then outputs the amplified input light. The dispersion-shifted fiber (DSF) 108 executes a wavelength conversion operation of input light, namely an FWM (four-wave mixing) operation. The band-pass filter (BPF) 109 outputs only a necessary band of input light. The signal light and the pumping light outputted from the laser diode (LD) 103 pass through polarization controllers (PCs) 101 and 104 respectively, and are phase-modulated by the phase modulators (PMs) 102 and 105 based upon the modulation signal outputted from the oscillator 110, respectively. The light outputted from the phase modulator (PM) 102 is multiplexed with the light outputted from the phase modulator (PM) 105 by the coupler 106. In this embodiment mode, the polarization controller (PC) 111 is properly interposed between the phase modulators 102, 105 and the coupler 106. However, if the PCs 101 and 104 are continuously controlled under optimum conditions, and also the output power of the two PMs 102 and 105 is continuously maintained at maximum power, then a relative polarization state of the light outputted from the two PMs 102 and 105 is continuously constant. As a consequence, if fibers located at such a portion defined just after the PMs 102 and 105 and just before the EDFA 107 are constituted by employing a polarization maintaining fiber (PMF), then the fiber located just after one of these PMs 102 and 105 may be fitted to a polarization state of the other fiber by twisting the own fiber. Thus, the polarization controller (PC) 111 located before the coupler 106 may be omitted. Subsequently, both the signal light and the pumping light, which have been multiplexed, are amplified by the Eribium-doped fiber amplifier (EDFA) 107, and thereafter, the amplified signal light and the amplified pumping light are processed by the dispersion-shifted fiber (DSF) 108 and the band-pass filter (BPF) 109, so that FWM light is outputted.

As represented in the drawing, in accordance with the present invention, the pumping light is phase-modulated based upon a modulation index of "$m_p$" and a frequency of "$\omega_m$", namely ($m_p\cos(\omega_m t+\phi)$). Furthermore, not only the pumping light, but also the signal light are phase-modulated based upon a modulation index of "$m_s$," and the frequency of "$\omega_m$", namely ($m_s\cos\omega_m t$). In this case, assuming now that symbol "$\tau$" shows a time delay between both the phase-modulated signals, it becomes:

$$\phi_s=m_s\cos\omega_m(t-\tau) \quad (9)$$

As a result, if the below-mentioned relationship can be satisfied, then the phase modulation component ($2\phi_p-\phi_s$) of the electric field $E_f$ of the FWM light defined in the formula (7) can be canceled, so that broadening of the spectrum of the FWM light can be suppressed:

$$2m_p = m_s \quad (10)$$

$$\omega_m\tau = 2n\pi \text{ (n:integer)} \quad (11)$$

(3) Second Embodiment

Figure 3:
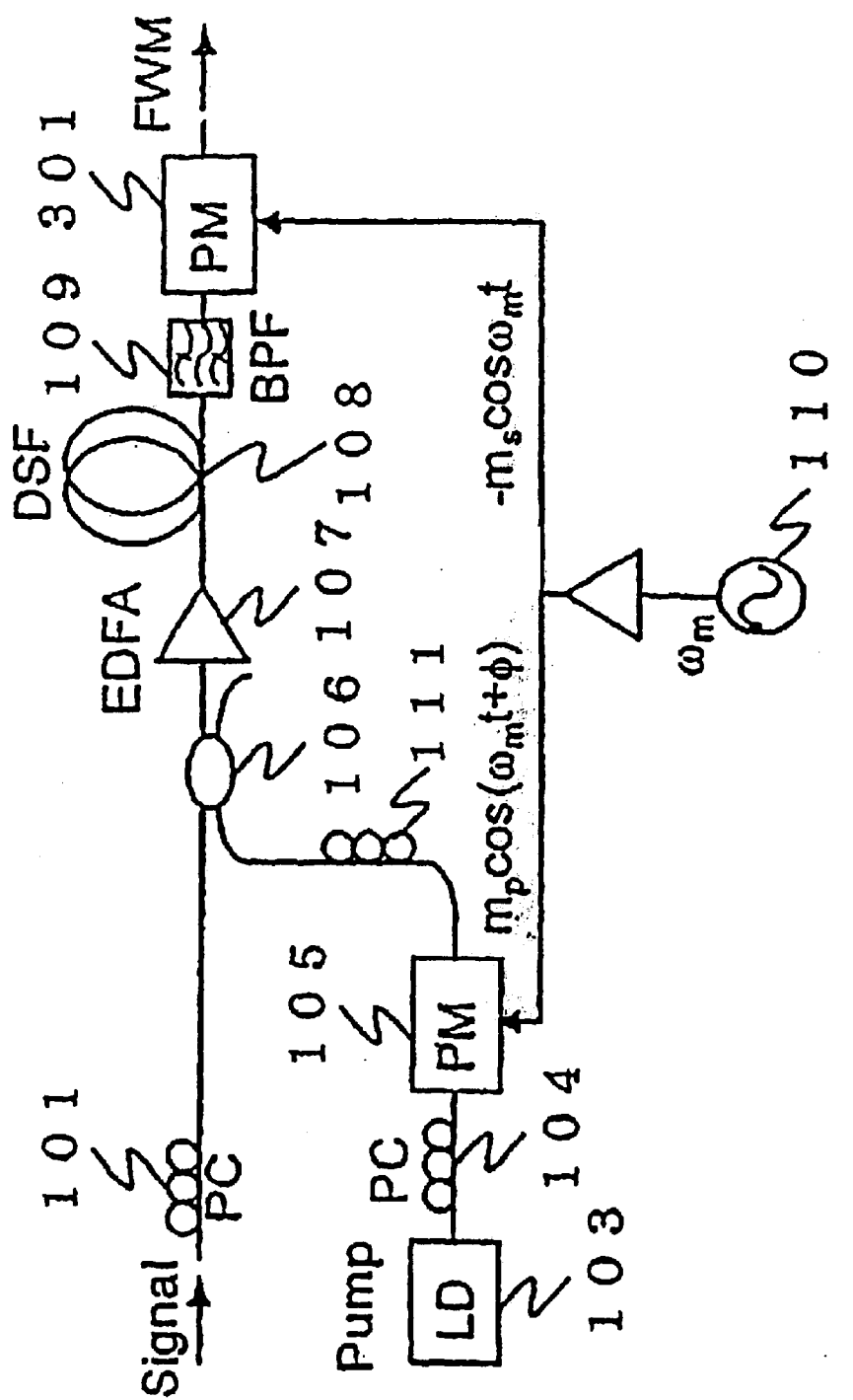
FIG. 3 is a structural diagram for showing that both signal light and pumping light are phase-modulated.

FIG. 3 is a structural diagram for showing a wavelength conversion apparatus according to a second embodiment mode of the present invention. This drawing shows an arrangement in which both FWM light and pumping light are phase-modulated. The wavelength conversion apparatus of this embodiment mode is provided with polarization controllers (PCs) 101, 104, 111; phase modulators (PMs) 105, 301; a laser diode (LD) 103; a coupler 106; an Eribuim-doped fiber amplifier (EDFA) 107; a dispersion-shifted fiber (DSF) 108; a band-pass filter (BPF) 109; and an oscillator 110. The phase modulator (PM) 301 phase-modulates input light based upon a modulation signal outputted from the oscillator 110, and then outputs the phase-modulated input light. Other structural elements of this embodiment mode are similar to those of FIG. 2.

Pumping light derived from the laser diode (LD) 103 penetrates the polarization controller (PC) 104, and then, is phase-modulated based upon the modulation signal outputted from the oscillator 110 ($m_p \cos(\omega_m t + \phi)$). In the coupler 106, signal light passing through the polarization controller (PC) 101 is multiplexed with the above-described pumping light. The polarization controller (PC) 111 may be properly interposed between the phase modulator 105 and the coupler 106. However, if the PCs 101 and 104 are continuously controlled under optimum conditions, and also the output power of the (PM) 105 and the output power of the signal light are continuously maintained at maximum power, then a relative polarization state of the light outputted from the signal light and the (PM) 105 is continuously constant. As a consequence, if fibers located at such a portion defined just after the (PM) 105 and just before the EDFA 107 are constituted by employing a polarization maintaining fiber (PMF), then the fiber located after the (PM) 105 may be fitted to a polarization state of the other fiber by twisting the own fiber. Thus, the polarization controller (PC) 111 located before the coupler 106 may be omitted. Subsequently, both the signal light and the pumping light, which have been multiplexed, are amplified by the Eribium-doped fiber amplifier (EDFA) 107. Then the amplified signal light and the amplified pumping light are entered via the dispersion-shifted fiber (DSF) 108 and the band-pass filter (BPF) 109 into the phase modulator (PM) 301. In this phase shifter (PM) 301, the FWM light is phase-modulated based upon the modulation signal outputted from the oscillator 110, and thereafter, the phase-modulated FWM light is outputted. In this embodiment mode, as shown in this drawing, the FWM light is phase-modulated based upon a modulation index of "$-m_s$" and a frequency of "$\omega_m$", namely ($-m_s \cos \omega_m(t-\tau)$), instead of such a phase modulation as to the signal light. In this case, assuming now that an initial value of an optical electric field of the signal light expressed in the formula (5) is equal to $\phi_s = 0$, an optical electric field $E_f$ of FWM light outputted from the BPF 109 after the DSF 108 may be expressed as:

$$E_f = kE_{s0}^* E_{p0}^2 \exp j[(2\omega_p - \omega_s)t + 2m_p \cos(\omega_m t + \phi)] \quad (12)$$

At this time, a phase of an optical electric field of output light from the phase modulator 301 becomes $2m_p \cos(\omega_m t + \phi) - m_s \cos\omega_m(t-\tau)$. As a result, if both the formula (10) and the below-mentioned formula (13) can be satisfied, then the phase modulation component ($2\phi_p = \phi_s$) defined in the formula (7) can be canceled in a similar manner to that of FIG. 2, so that broadening of the spectrum can be suppressed:

$$\omega_m\tau = 2n\pi = \phi \quad (13)$$

In this case, since the phase modulators employed in the case of FIG. 2 are located at the substantially same places, a time delay "$\tau$" between both the phase modulation signals is short. To the contrary, in the case of FIG. 3, a time delay "$\tau$" becomes optical propagation time within the DSF 108. The DSF 108 requires such a length of FWM operation. For instance, even when a high non-linear optical fiber is employed, several hundreds meters, or more of the fiber length are required as the DSF 108. Also, since the time delay "$\tau$" may be susceptibly changed by expansions/compressions of an optical fiber caused by outer disturbances, temperature variations, and the like, such a feedback circuit is required, by which the phase between both the phase modulation signals may be changed with respect to this change in the time delays.

(4) Third Embodiment

Figure 4:
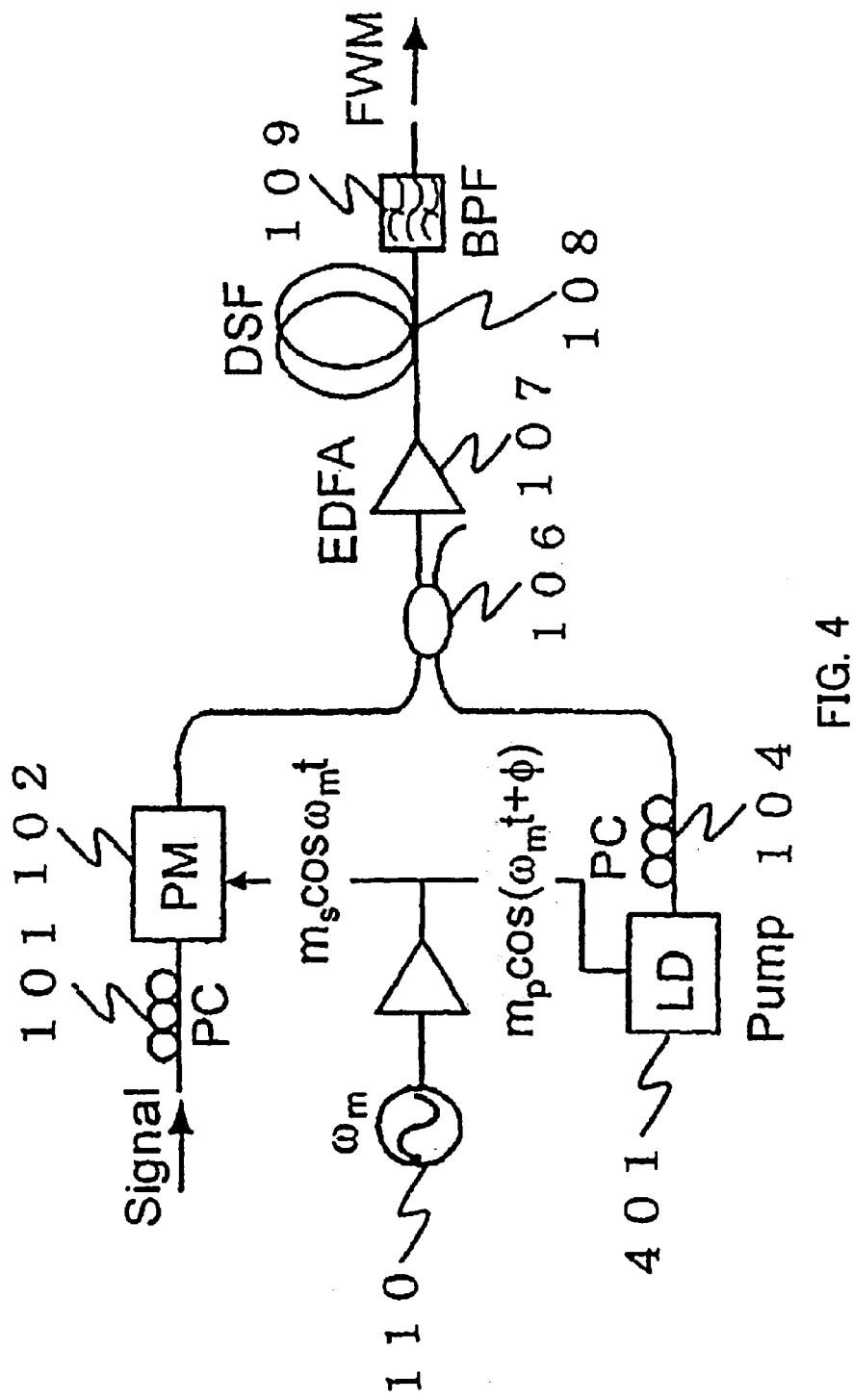
FIG. 4 is a structural diagram for indicating that signal light is phase-modulated, and pumping light is directly frequency-modulated.

Next, FIG. 4 is a structural diagram for showing a wavelength conversion apparatus according to a third embodiment mode of the present invention. This drawing shows an arrangement in which signal light is phase-modulated, and pumping light is directly frequency-modulated. The wavelength conversion apparatus of this embodiment mode is provided with polarization controllers (PCs) 101, 104; a phase modulator (PM) 102; a laser diode (LD) 401; a coupler 106; an Eribuim-doped fiber amplifier (EDFA) 107; a dispersion-shifted fiber (DSF) 108; a band-pass filter (BPF) 109; and an oscillator 110. The laser diode (LD) 401 corresponds to such a light emitting unit for frequency-modulating pumping light based upon a modulation signal outputted from the oscillator 110, and then, for outputting the frequency-modulated pumping light. Other structural elements of this wavelength conversion apparatus are similar to those of FIG. 2.

The signal light is entered via the polarization controller (PC) 101 to the phase modulator (PM) 102. In this phase modulator 102, the signal light is phase-modulated based upon the modulation signal outputted from the oscillator 110, and thereafter, the phase-modulated signal light is outputted ($m_s \cos \omega_m t$). On the other hand, the pumping light is directly frequency-modulated based upon the modulation signal outputted from the oscillator 110 by the laser diode (LD) 401 ($m_p \cos(\omega_m t + \phi)$), and then, the frequency-modulated pumping light passes through the polarization controller (PC) 104. Thereafter, the above-described signal light is multiplexed with the pumping light by the coupler 106. Subsequently, after the multiplexed pumping light has been amplified by the Eribium-doped fiber amplifier (EDFA) 107, the amplified pumping light are processed by the dispersion-shifted fiber (DSF) 108 and the band-pass filter (BPF) 109, so that FWM light is outputted.

When an injection current to the semiconductor laser diode (LD) 401 is changed, an oscillating frequency may be changed. A change amount of an oscillating frequency is directly proportional to a magnitude of a change amount of an injection current. When the optical electric field "$E_p$" of pumping light is defined by the following formula (14), a change in oscillating frequencies may be expressed by "$d\phi_p/dt$":

$$E_p = E_{p0} \exp j (\omega_p t + \phi_p) \quad (14)$$

On the other hand, assuming now that an injection current "$I_p$" is defined by that a sine wave is superimposed on a DC component as expressed by:

$$I_p = I_{p0} + I_m \cos \omega_m t \qquad (15)$$

maximum frequency deviation "B" is directly proportional to a magnitude of a current "$I_m$". The maximum frequency deviation "B" is equal to an oscillating frequency difference between ($I_{p0}+I_m$m), namely when the injection current value becomes maximum, and ($I_{p0}-I_m$), namely when the injection current value becomes minimum. As a consequence, a change in the oscillating frequencies may be expressed by the following formula (16) at this time;

$$d\phi_p/dt = \pi B \cos \omega_m t \qquad (16)$$

As a consequence, since it becomes:

$$\phi_p = (\pi B/\omega_m) \sin \omega_m t + const \qquad (17),$$

if the signal light is phase-modulated which can satisfy the below-mentioned formulae (18) and (19), then the phase modulation component in the formula (7) can be canceled, so that broadening of the spectrum of the FWM light can be suppressed:

$$2\pi B/\omega_m = m_s \qquad (18)$$

$$\omega_m \tau = (2n+1/2)\pi \text{(n:integer)} \qquad (19)$$

(5) Fourth Embodiment

Figure 5:
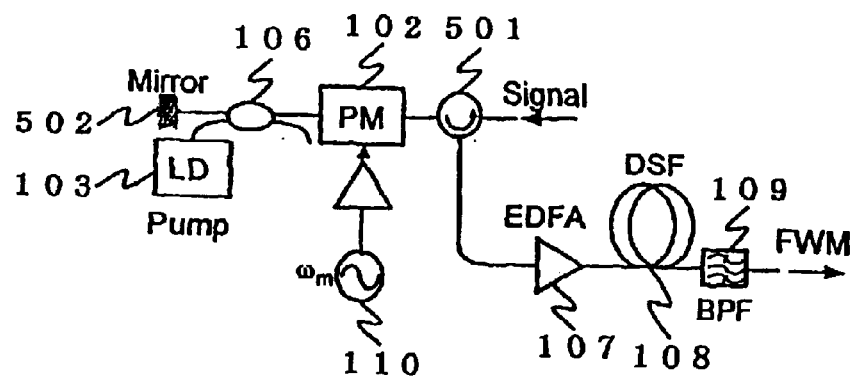
FIG. 5 is a structural diagram for indicating that both signal light and pumping light are phase-modulated by a single phase modulator.

Alternatively, both signal light and pumping light may be phase-modulated by using a single set of phase modulator. FIG. 5 is a structural diagram for showing a wavelength conversion apparatus according to a fourth embodiment mode of the present invention. This drawing shows an arrangement in which both signal light and pumping light are phase-modulated by a single phase detector. The wavelength conversion apparatus of this embodiment mode is provided with a circulator 501; a phase modulator (PM) 102; a laser diode (LD) 103; a coupler 106; a mirror 502; an Eribuim-doped fiber amplifier (EDFA) 107; a dispersion-shifted fiber (DSF) 108; a band-pass filter (BPF) 109; and an oscillator 110. The circulator 501 controls an output direction of input light. The mirror 502 reflects thereon input light. Other structural elements of this wavelength conversion apparatus are similar to those of FIG. 2.

The signal light is entered via the circulator 501 to the phase modulator (PM) 102. In this phase modulator 102, the signal light is phase-modulated based upon the modulation signal outputted from the oscillator 110, and thereafter, the phase-modulated signal light is reached via the coupler 106 to the mirror 502. Then the signal light is reflected on the mirror 502, and the reflected light is again entered via the coupler 106 into the phase modulator (PM) 102. In this phase modulator (PM) 102, this entered signal light is again phase-modulated based upon the modulation signal outputted from the oscillator 110. On the other hand, the pumping light outputted from the laser diode (LD) 103 is entered via the coupler 106 into the phase modulator (PM) 102. In this phase modulator (PM) 102, this entered pumping light is phase-modulated based upon the modulation signal outputted from the oscillator 110. In this phase modulator (PM) 102, both the signal light and the pumping light, which are outputted from the phase modulator (PM) 102, are amplified via the circulator 501 by the Eribium-doped fiber amplifier (EDFA) 107, and thereafter, the amplified signal light and the amplified pumping light are processed by the dispersion-shifted fiber (DSF) 108 and the band-pass filter (BPF) 109, so that FWM light is outputted. In this arrangement, the signal light is phase-modulated two times by the phase modulator based upon the frequency of "$\omega_m$" and the modulation index of "m", whereas the pumping light is phase-modulated only one time. Assuming now that symbol "$\tau$" indicates a time delay between the phase modulator and the mirror, since it becomes:

$$\phi_p = m \cos \omega_m t \qquad (20),$$

$$\phi_s = m \cos \omega_m t = m \cos \omega_m (t-2\tau) \qquad (21),$$

the phase modulation can be canceled by the following formula (22) based upon the formula (7):

$$\omega_m \tau = n\pi \text{(n:integer)} \qquad (22).$$

As a result, broadening of the spectrum of the FWM light can be suppressed. It should be understood that generally speaking, since a phase modulator is a traveling wave type phase modulator, this phase modulator owns a directional characteristic. However, such a fact is known that the phase modulator may own substantially same modulation characteristics along a forward direction and a reverse direction up to approximately 500 MHz (see "Information distributing system and Polarization independent external modulator by optical circuit" written by HASEGAWA and ISHIDA, No. B707, 1995, Communication Society Conference of Japanese Electronic Information Communication Institute).

(6) Fifth Embodiment

In general, an FWM operation in an optical fiber owns a polarization dependent characteristic. However, the FWM operation in the optical fiber may have a polarization independent characteristic by way of orthogonal polarization two-wavelength pumping, and a polarization diversity arrangement (see S. Yamashita, S. Y. Set, and R. I. Laming, "Polarization independent, all-fiber phase conjugation incorporating inline fiber DFB lasers", IEEE Photonics Technology Letters, vol. 10, no. 10, pp. 1407–1409, October 1998., S. Watanabe, S. Takeda, and T. Chikama, "Interband wavelength conversion of 320 Gb/s (32×10 Gb/s) WDM signal using a polarization-insensitive fiber four-wave mixer", ECOC'98, Postdeadline paper.) Even when any of these methods is employed, it is possible to realize a high-efficiency optical fiber wavelength converter without a broadened spectrum to which the methods of FIG. 2 to FIG. 4 are applied. However, a specific care should be taken to such a case that a phase modulator owns a polarization dependent characteristic, and more specifically, as to signal light, a polarization state thereof appears at random. This problem may be solved by that a polarization independent phase modulator is constituted by the below-mentioned polarization diversity structure.

Figure 6:
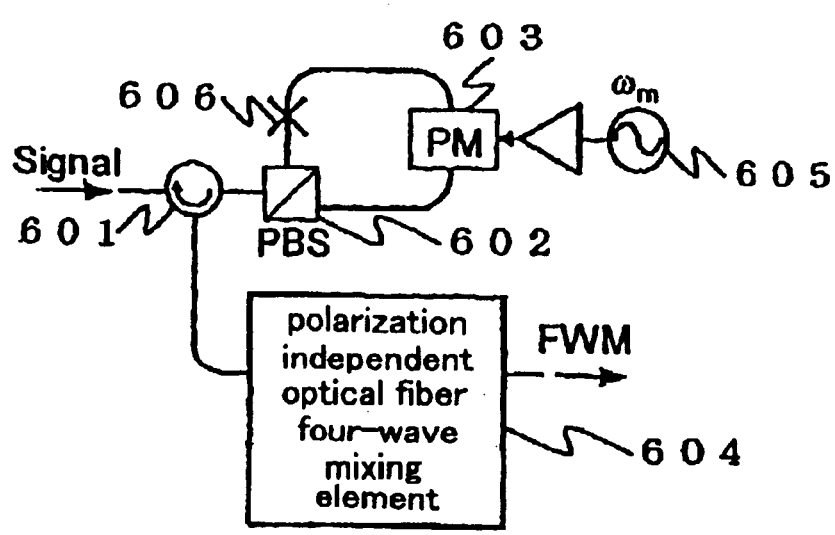
FIG. 6 is a structural diagram for showing a polarization independent type wavelength conversion apparatus.

FIG. 6 is a structural diagram for showing a wavelength conversion apparatus according to a fifth embodiment mode of the present invention. This drawing represents an arrangement of a polarization independent type wavelength conversion apparatus. The polarization independent type wavelength conversion apparatus of this embodiment mode is provided with a circulator 601, a polarization beam splitter (PBS) 602, a phase modulator (PM) 603, a polarization independent fiber FWM element 604, an oscillator 605, and also a 90 degree twisting unit 606. The circulator 601 controls an output direction of input (incident) light. The polarization beam splitter (PBS) 602 splits input light into two polarized waves orthogonal to each other, and multiplies the polarized waves with each other. The oscillator 605 outputs a modulation signal. The phase modulator (PM) 603 phase-modulates input light based upon the modulation signal outputted from the oscillator 605, and then, outputs the phase-modulated input light. The 90-degree twisting unit 606 twists input light by 90 degrees, and then outputs the 90-degree twisted input light. It should be noted that the 90-degree twisting unit 606 may be replaced by a ½-wavelength plate. The polarization independent fiber FWM 604 performs a polarization independent wavelength conversion operation.

Signal light which is entered via the circulator 601 into the polarization beam splitter (PBS) 602 is split into polarized waves which are orthogonal to each other. The polarized waves are propagated through a ring along opposite directions, while this ring is constructed of the PBS 602 and the (PM) 603. In this case, if distances from respective ports of the PBS 602 up to the (PM) 603 are made equal to each other, then two polarization waves may be modulated by the same modulations in the (PM) 603. Furthermore, the 90-degree twisting unit 606 is inserted into any one of two paths routed from the PBS 602 to the (PM) 603. In this case, the 90-degree twisting unit 606 twists the input light by 90 degrees, and then outputs the 90-degree twisted input light. It should also be noted that two sets of returned polarization waves are multiplexed with each other by the PB 602, and then, the multiplexed polarization wave is outputted from the original input port. Thereafter, this multiplexed polarization wave is processed based upon the polarization independent wavelength conversion by the polarization independent fiber FWM 604, so that FWM light is outputted.

It should also be noted that in the above-described embodiment mode, since the phase modulator basically does not own the wavelength dependent characteristic, even when the signal light is the WDM signal, the arrangements of FIG. 2 to FIG. 6 may be directly applied. Also, other proper modulation systems than the above-described phase modulation system may be employed as the modulation system. Furthermore, since the optical fiber may perform the four-wave mixing operation, a properly-selected optical fiber, or a properly-selected device may be employed. Also, although the 90-degree twisting unit 606 is provided within the upper-sided path defined from the circulator 601 to the (PM) 603 in FIG. 6, this 90-degree twisting unit 606 may be set within a lower-sided path.

(7) Measuring Experiment

To confirm an effective characteristic of the present invention, as one example, the measuring experiment was carried out as to the wavelength conversion apparatus of the first embodiment mode with employment of the below-mentioned arrangement.

Figure 7:
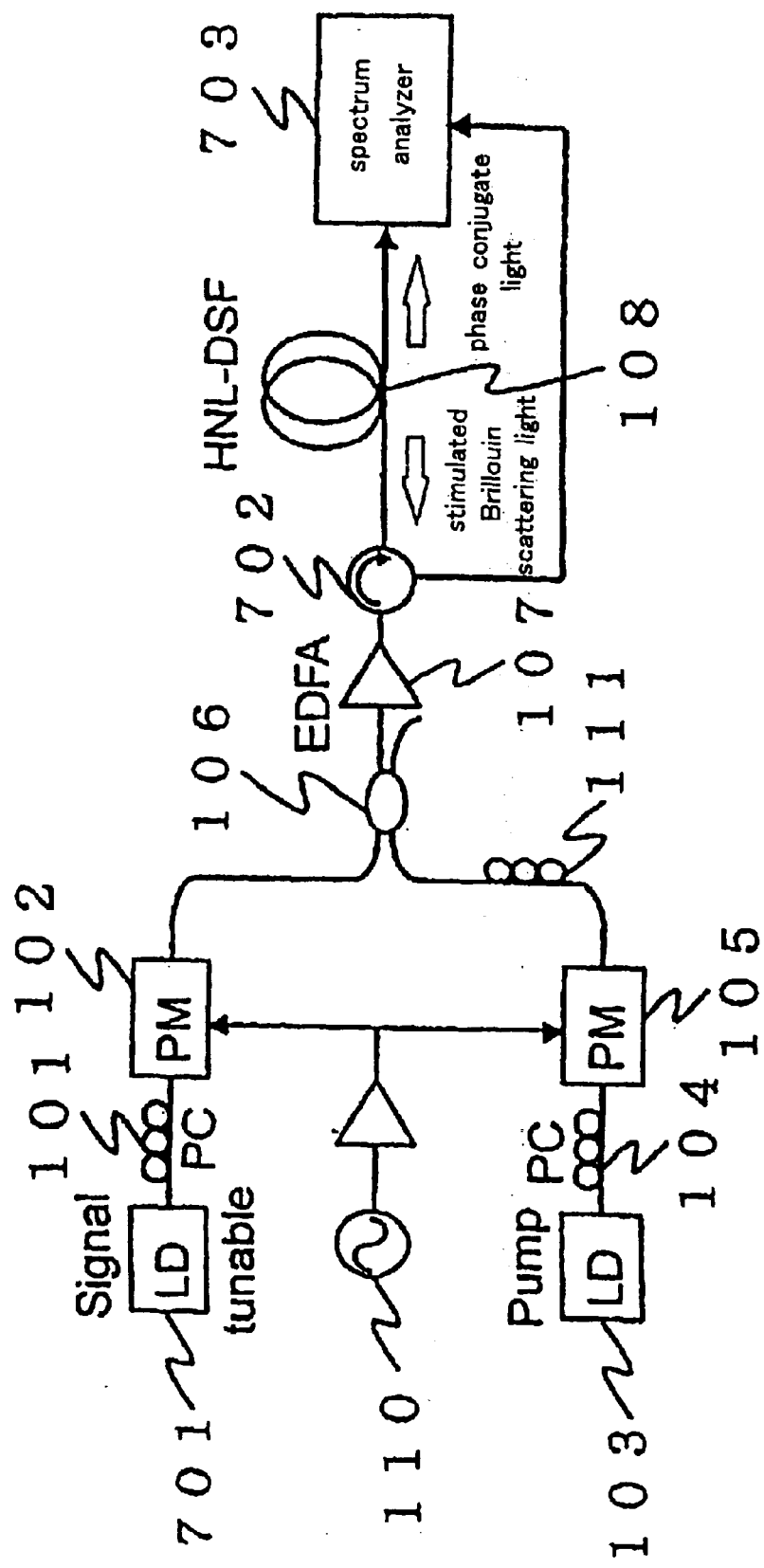
FIG. 7 is a structural diagram for representing an experimental system of a high-efficiency optical fiber wavelength converter.

FIG. 7 shows a structural diagram of the measuring experiment as to the wavelength conversion apparatus. This drawing indicates an arrangement of a high-efficiency optical fiber wavelength converter experimental system. This arrangement of the high-efficiency optical fiber wavelength converter experimental system is provided with laser diodes (LDs) 701, 103; polarization controllers (PCs) 101, 104, 111; phase modulators (PMs) 102, 105, a coupler 106; an Eribuim-doped fiber amplifier (EDFA) 107; a circulator 702; a dispersion-shifted fiber (DSF) 108; a spectrum analyzer 703; and an oscillator 110. The laser diode (LD) 701 corresponds to a light emitting unit for outputting pumping light. The circulator 702 controls an output direction of input light. The dispersion-shifted fiber 108 performs a wavelength conversion operation of input light. In this measuring experiment, a high nonlinear dispersion-shifted fiber (HNL-DSF) is employed. The spectrum analyzer 703 analyzes a spectrum of input light. Other structural elements are similar to those of FIG. 2.

Laser light LD701 for signal light and laser light LD103 for pumping light are entered via the polarization controller (PCs) 101 and 104 into the phase modulators (PMs) 102 and 105, respectively. In these phase modulators (PMs) 102 and 105, the laser light LD701 and the laser light LD 103 are phase-modulated based upon a sine wave having a frequency of 500 MHz outputted from the oscillator 110. In this case, a modulation factor of signal light must be made two times higher than a modulation factor of pumping light in accordance with the formula (10) of the above description. At this time, the modulation factors are directly proportional to peak-to-peak values of voltages applied to the phase modulators 102 and 105, respectively. It should be understood that in the phase modulators 102 and 105 employed in FIG. 7, voltages (namely, half wavelength voltages) required to $\pi$-change phases are different from each other, namely, the half wavelength voltage on the signal light side is equal to 3.8 V, whereas the half wavelength voltage on the pumping light side is equal to 4.6 V. As a consequence, a ratio of voltages to be applied is selected to be 2×3.8:4.6=7.6:4.6. In this experiment, as a condition approximated to this voltage ratio, the voltage values of 7.8 V and 4.6 V were employed. In other word, values of applied voltages are different from each other, depending upon characteristics of phase modulators to be employed. Also in FIG. 7, since the ratio of the applied voltages is an important factor, any other voltages may be employed when these voltages may satisfy this voltage ratio. Furthermore, a phase shift may be carried out. The output wavelength of the laser light LD103 is made coincident with the zero dispersion wavelength 1554 nm of the high nonlinear optical fiber (HNL-DSF) 108 (see M. Onishi, T. Okuno, T. Kashiwada, S. Ishikawa, N. Akasaka and M. Nishimura, "Highly nonlinear dispersion shifted fiber and its application to broadband wavelength converter", ECOC'97, no TU2C, pp. 115–118, 1997). After output light from the two phase modulators 102 and 105 are multiplexed with each other via the coupler 106, the multiplexed light is amplified by the Erbium-doped fiber amplifier (EDFA) 107, and then, the amplified light is entered via the circulator 702 into the high nonlinear optical fiber (HNL-DSF) 108 having the length of 500 meters. Inside the HNL-DSF 108, the wavelength conversion operation is carried out by FWM operation, and then, the wavelength-converted light is entered into the spectrum analyzer 703. In this case, the polarization controller (PC) 111 may be properly interposed between each of the phase modulators 102, 105 and the coupler 106.

Figure 8:
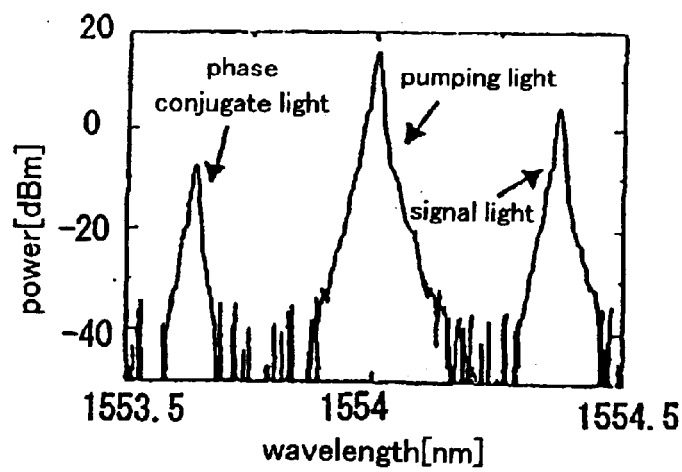
FIG. 8 is an explanatory diagram for explaining a spectrum of output light.
Figure 8:
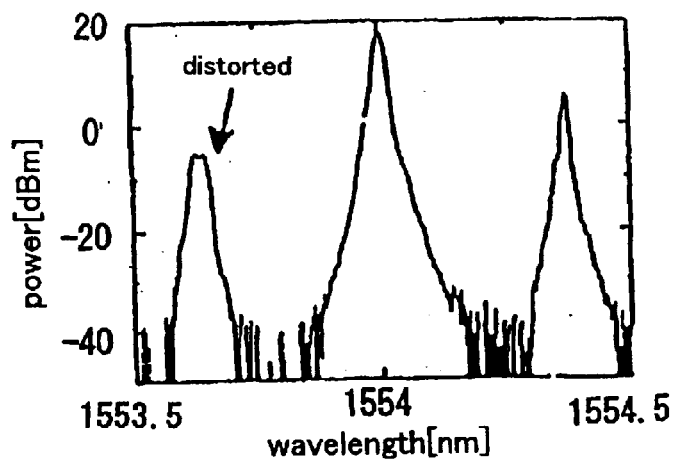
Figure 8:
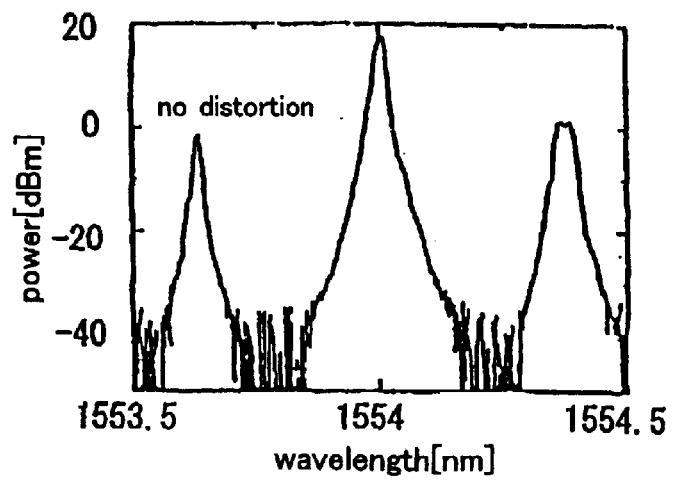

FIG. 8 is an explanatory diagram for explaining a spectrum of output light. An horizontal axis of FIG. 8 shows a wavelength of output light, and an vertical axis of FIG. 8 indicates power of the output light. In this drawing, spectra of signal light, pumping light, and phase conjugate light from the long wavelength side. FIG. 8(a) shows such a case that both pumping light and signal light are not phase-modulated, and a spectrum of the signal light whose wavelength has been converted is not broadened. The power of the pumping light is restricted by the stimulated Brillouin scattering (SBS) phenomenon (in this case, for example, 16 dBm). As a result, there is a limitation in an improvement of a conversion efficiency. FIG. 8(a) indicates such a case that the pumping light is phase-modulated and the spectrum is spread. While the SBS phenomenon is suppressed, the large power (18 dBm) of the pumping light may be utilized. However, the spectrum of the phase conjugate light which has been wavelength-modulated owns a spread, so that this spread spectrum of the phase conjugate light does not correspond to such a spectrum of light obtained by inverting the original signal light spectrum (namely, light located on the longest wavelength sides in FIG. 8(a) and FIG. 8(b)). As a consequence, dispersion compensation cannot be carried out by employing a wavelength converter under this condition.

FIG. 8(c) indicates a spectrum of output light obtained by executing such a method that both the pumping light and the signal light, provided by the present invention, are phase-modulated, and spectra of the phase-modulated light are broadened. Similar to FIG. 8(b), since the power (for example, 18 dBm) of the pumping light can be increased, a converting efficiency of FIG. 8(c) may be improved, as compared with FIG. 8(a). Also, in comparison with FIG. 8(b), a spectrum of phase conjugate light is not broadened, and corresponds to such an inverted spectrum of the original signal, so that the spectrum is restored. Since the method provided by the present invention is carried out, such a confirmation could be made that the ideal wavelength conversion operation could be carried out in view of the spectrum, while achieving the higher conversion efficiency.

Figure 9:
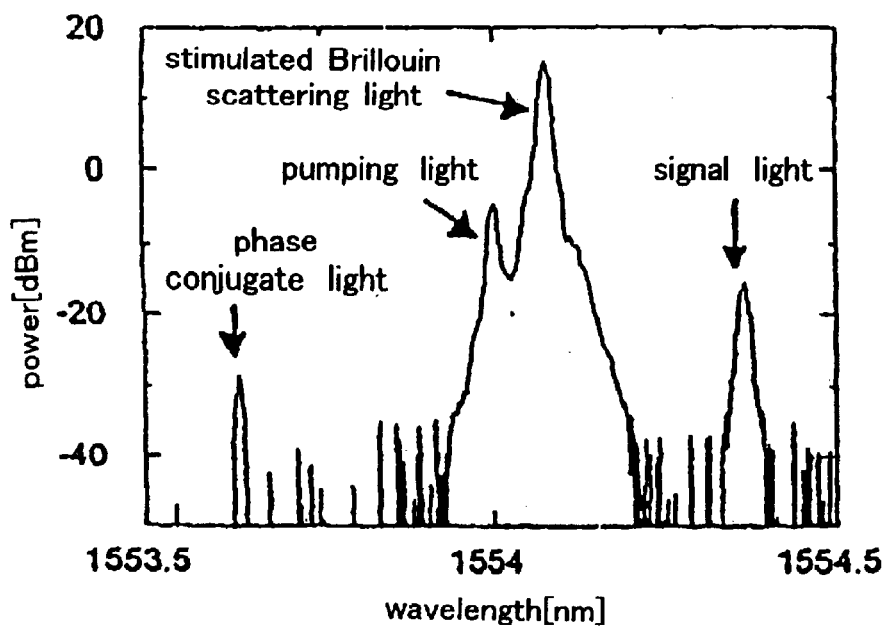
FIG. 9 is an explanatory diagram for explaining a spectrum of backward propagation light.
Figure 9:
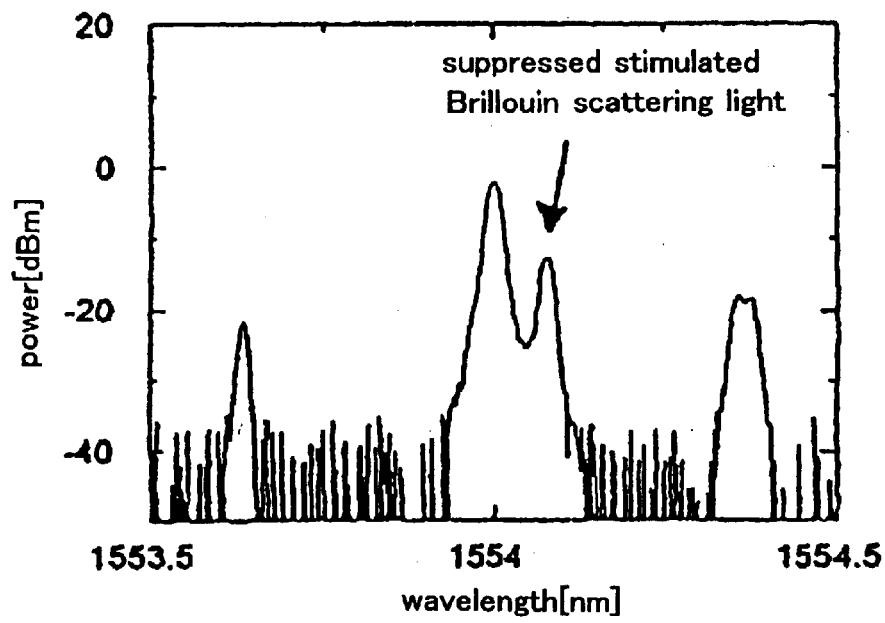

FIG. 9 is an explanatory diagram for explaining a spectrum of backward propagation light. FIG. 9(a) shows a condition of a backward scattering spectrum in the case that pumping light is not phase-modulated, and FIG. 9(b) represents a condition of a background scattering spectrum in the case that pumping light is phase-modulated. In FIG. 9(a), a stimulated Brillouin scattering phenomenon (SBS, namely, light on the slight longer wavelength side than Pump) of approximately 15 dBm is observed. This spectrum condition implies that an approximately half of pumping light (in this case, for example, about 18 dBm) which is entered into the DSF is reflected backwardly, resulting in a low efficiency. When incident power of the pumping light is furthermore increased, this phenomenon may become more conspicuous. To the contrary, in FIG. 9(b), it can been seen that this SBS phenomenon may be suppressed to a low scattering (in this case, for example, on the order of −12.5 dBm). In other words, such an incident pumping light having high power may be effectively utilized in a wavelength conversion operation without being scattered backwardly. In particular, this is such a phenomenon achieved by spreading the spectrum of the pumping light. It should also be noted that when only the pumping light is spectrum-spread, since the light whose wavelength has been converted is broadened as shown in FIG. 8(b), the present invention may become effective as the solving method thereof.

Figure 10:
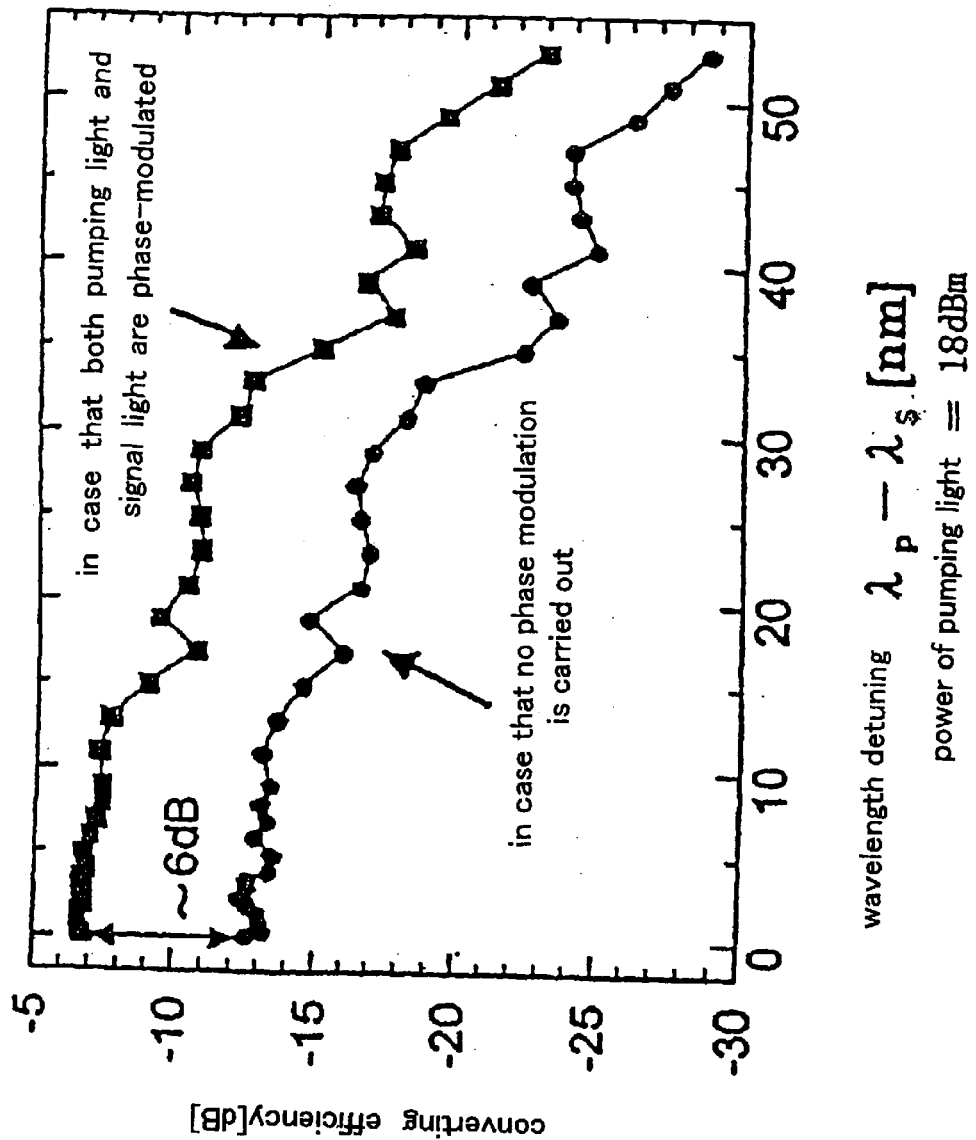
FIG. 10 is an explanatory diagram for explaining a wavelength conversion efficiency.

Also, FIG. 10 is an explanatory diagram for explaining a wavelength conversion efficiency. This drawing shows a measurement result of a wavelength conversion efficiency in the case that both pumping light and signal light are not phase-modulated, and also indicates a measurement result of a wavelength conversion efficiency in the case that both pumping light and signal light are phase-modulated. A wavelength detuning of an horizontal axis indicates a difference between a wavelength "$\lambda_p$" of pumping light and another wavelength "$\lambda_s$" of signal light. An vertical axis indicates a conversion efficiency, namely a ratio of power of signal light entered into the DSF to power of phase conjugate light outputted from this DSF. In the best ideal case, even when the wavelength of the signal light is separated far from the pumping light, the conversion efficiency must be constant. However, in the actual case, since the zero dispersion wavelength owns a fluctuation along the fiber length direction, the conversion efficiency does not own the maximum value, but, the further the wavelengths are separated, the more the conversion efficiency is deteriorated. In this drawing, both an upper curve and a lower curve indicate a conversion efficiency achieved by performing the spread spectrum method for both the pumping light and the signal light, and also represent another conversion efficiency achieved by that both the pumping light and the signal light are not spectrum-spread. As previously explained, since the Brillouin scattering is suppressed by the spread spectrum of the pumping light and also the pumping light having the high power can be utilized, the conversion efficiency can be improved (in this case, for instance, on the order of 6 dB). Also, the maximum value of the conversion efficiency achieved when the phase-modulating operations were carried out became −6.8 dB.

Furthermore, a spectrum change of FWM light was investigated in high resolution by way of such a heterodyne detection that another wavelength tunable light source was employed as a local oscillator.

Figure 11:
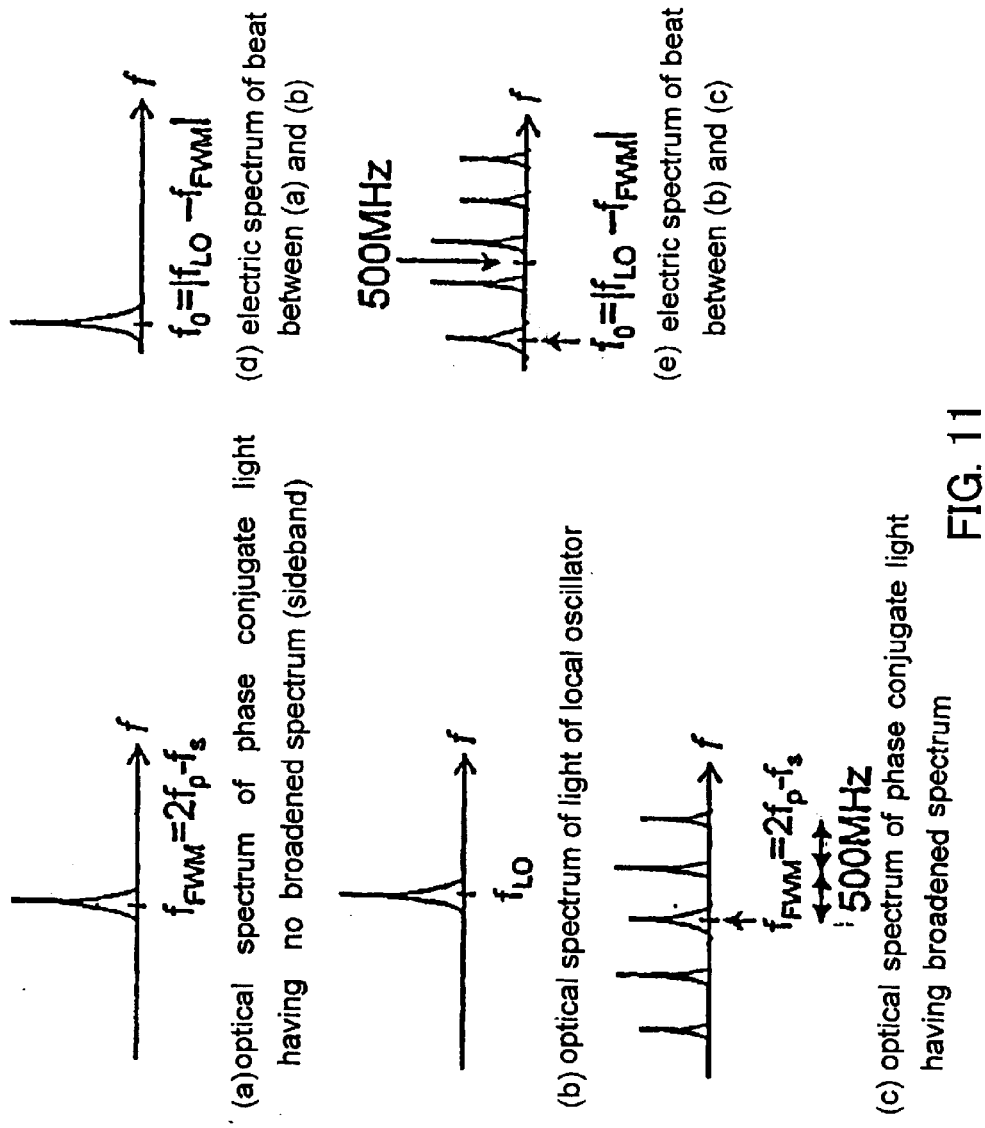
FIG. 11 is a schematic diagram for indicating a heterodyne detection.

FIG. 11 is a schematic diagram for indicating a condition of optical heterodyne detection. An horizontal axis of FIG. 11 shows a frequency. In such a case that ideal phase conjugate light (frequency: $f_{FWM}$) having no broadened spectrum, as shown in FIG. 11(a), is obtained by performing a wavelength conversion operation under such a condition that the condition (namely, formulae (10) and (11) in the specification) can be completely satisfied, this ideal phase conjugate light is heterodyne-detected by a local oscillating laser having a frequency "$f_{LO}$" as shown in FIG. 11(b). As a result, an output of a receiver, for example, an output of a photodiode (PD) owns only one spectrum component frequency $f_0 = |f_{LO} - f_{FWM}|$, as represented in FIG. 11(d). On the other hand, if the condition is not optimum, as shown in FIG. 11(c), then produced phase conjugate light owns a sideband other than the frequency "$f_{FWM}$" component and also owns a broadening component. When this phase conjugate light is heterodyne-detected, as represented in FIG. 11(e), a sideband is left other than the same frequency component $f_0 = |f_{LO} - f_{FWM}|$ as that of FIG. 11(d). Since this sideband should be originally suppressed, in the output spectrum of the photodiode (PD), if the frequency "$f_0$" component is increased larger than other frequency components, then the better result can be obtained. In this embodiment mode, more specifically, while a specific attention is paid to a primary sideband (500 MHz band), and also a strength ratio of the frequency-$f_0$ component to the primary sideband is assumed as "R", if this ratio "R" becomes larger, then the ideal condition can be obtained.

Figure 12:
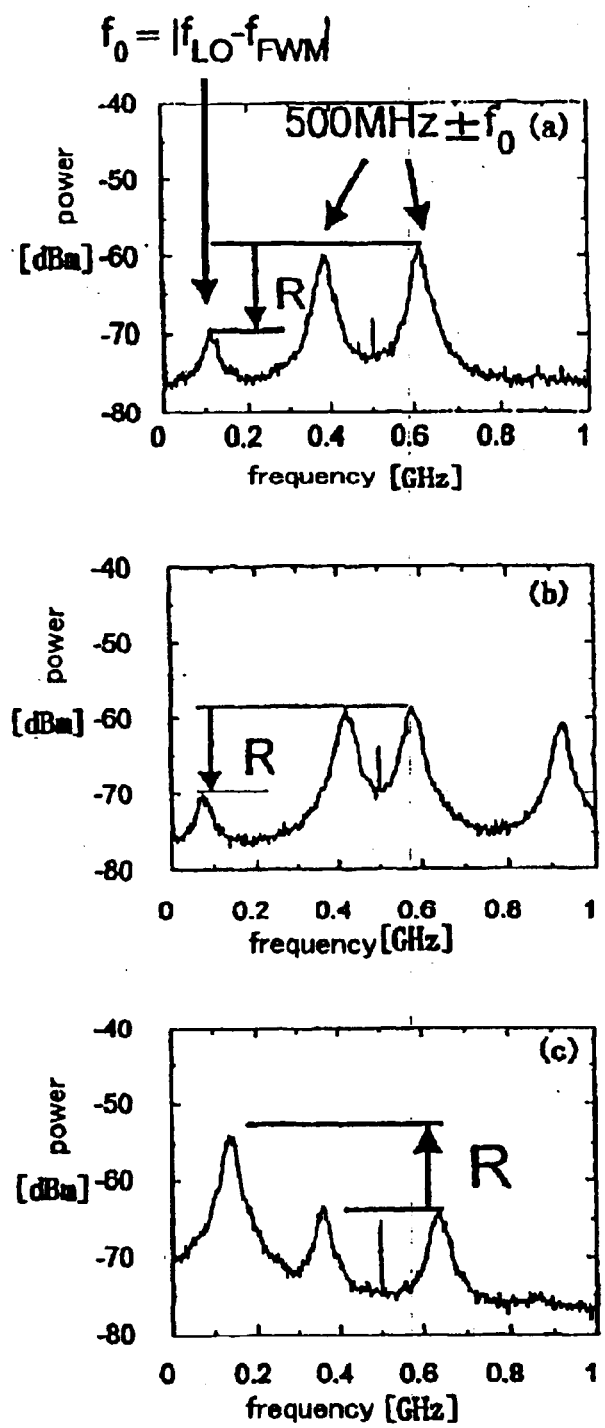
FIG. 12 is an explanatory diagram for explaining a heterodyne beat spectrum of FWM light.

FIG. 12 is an explanatory diagram for explaining a heterodyne beat spectrum of FWM light. In FIG. 12, a frequency difference between a local oscillator and an FWM light carrier is set to approximately 100 MHz. Within a beat spectrum shown in this drawing, a 100 MHz component indicates an FWM light carrier, and both a 400 MHz component and a 600 MHz component represent primary sidebands of ±500 MHz. A 900 MHz component corresponds to a second order sideband. FIG. 12(a) shows such a heterodyne beat spectrum obtained in the case that only pumping light is phase-modulated. In this case, a carrier is suppressed, and a large sideband component appears. Assuming now that a strength ratio of the carrier to the primary sideband is set to "R", this strength ratio "R" is equal to −10.5 dB in this example. FIG. 12(b) and FIG. 12(c) show heterodyne beat spectra in the case that both the pumping light and the signal light are phase-modulated. FIG. 12(b) and FIG. 12(c) indicate the heterodyne beat spectra when $m_s/m_p = 1.3$ and 2.1, respectively. In FIG. 12(b), a sideband cannot be suppressed, but remains (in this case, for instance, R=−11.3 dB). In FIG. 12(c), a sideband is suppressed, and a carrier is recovered (in this case, for example, R=10.5 dB).

Figure 13:
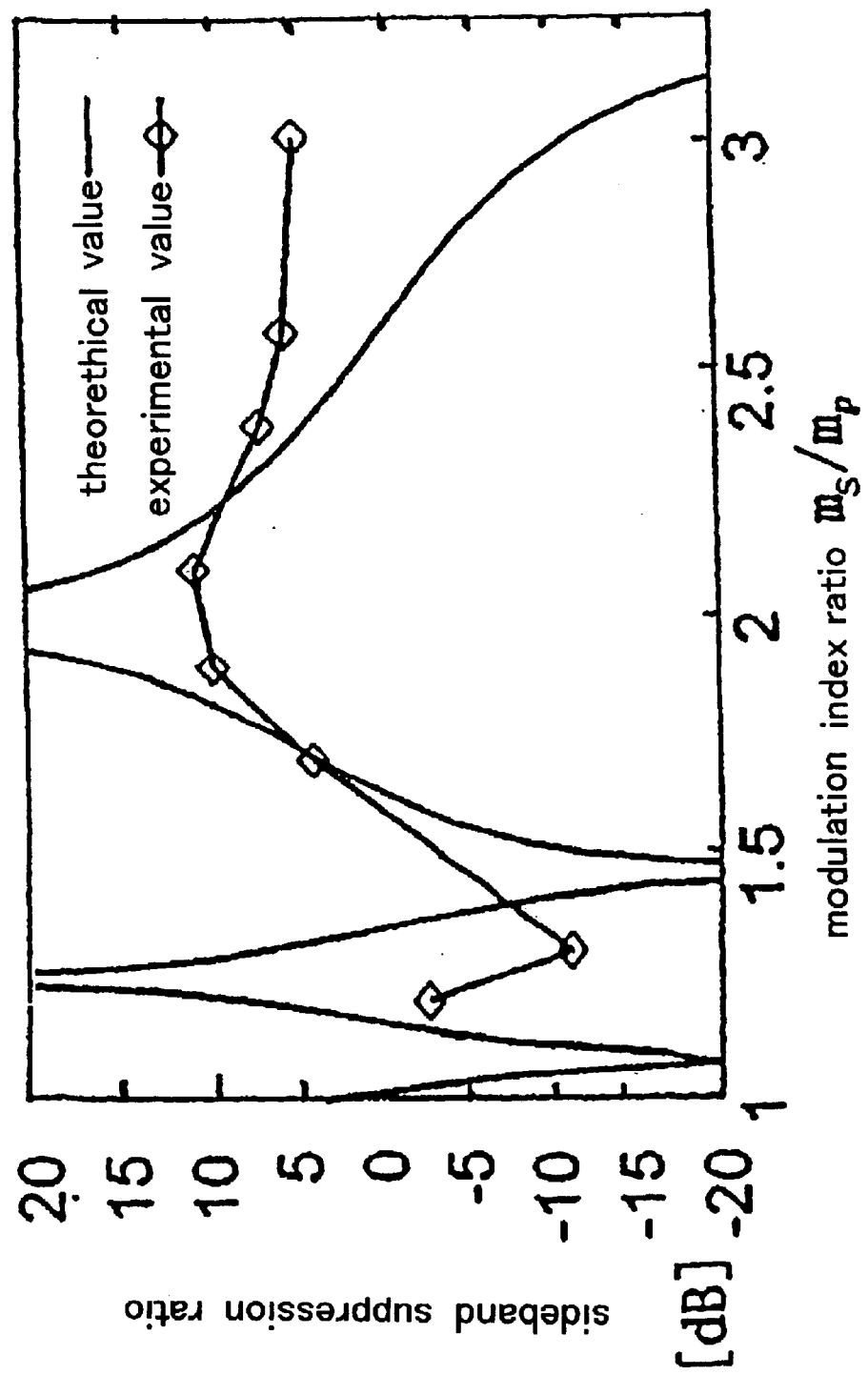
FIG. 13 is an explanatory diagram for explaining a sideband suppressing ratio when a modulation index ratio is changed.

FIG. 13 is an explanatory diagram for explaining a sideband suppression ratio when a modulation index ratio is changed. An horizontal axis of FIG. 13 shows a modulation index ratio of $m_s/m_p$, and an vertical axis of FIG. 13 represents the sideband suppression ratio "R" as explained in the previous item. The modulation index ratio of $m_s/m_p$ is changed by varying a magnitude of a voltage applied to the phase modulator on the side of the pumping light. Based upon the formula (10) of the specification, an ideal value should be, for example, $m_s/m_p=2$. Also, as to an experimental result, when the modulation index ratio is approximated to 2, the sideband suppression ratio "R" becomes large, so that the trend in the experimental result is made substantially coincident with the trend in the theoretical value. It is so conceivable that if a phase of an applied voltage is further strictly adjusted, then the experimental result may be approached to the theoretical value. It should be understood that since the strength ratio "R" is such a value depending upon the primary sideband, there are same possibilities that the large strength ratio "R" may be obtained even by another modulation index ratio. At this time, although the primary sideband is decreased, higher-order sidebands are produced and a spectrum of produced phase conjugate light is broadened. A care should be taken to such a fact that when the modulation index ratio is equal to 2, a completely different condition occurs.

(8) Sixth Embodiment

Figure 14:
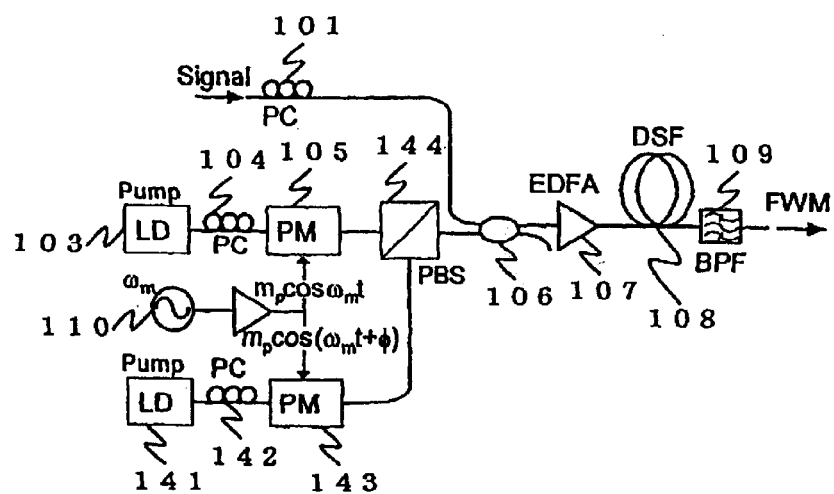
FIG. 14 is a structural diagram for indicating that both two sets of pumping light are phase-modulated in a orthogonal polarization two-wavelength pumping system.

A wavelength conversion operation, which does not depend upon a polarized wave of signal light, may be realized in such a manner that polarized waves of pumping light having different wavelengths are entered into an optical fiber in such a manner that these polarized waves are orthogonal to each other by a polarization beam splitter (PBS) by employing two sets of pumping light (orthogonal polarization two-wavelength pumping system) (see S. Yamashita, S. Y. Set, and R. I. Laming, "Polarization independent, all-fiber phase conjugation incorporating inline fiber DFB lasers, "IEEE Photonics Technology Letters", vol. 10, no. 10, pp. 1407–1409, October 1998). FIG. 14 is a structural diagram for indicating a wavelength conversion apparatus according to a sixth embodiment mode of the present invention. This drawing represents such an arrangement that both two sets of pumping light are phase-modulated in the orthogonal polarization two-wavelength pumping system. The wavelength conversion apparatus of this embodiment mode is provided with polarization controllers (PCs) 101, 104, 142; phase modulators (PMs) 105, 143; laser diodes (LDs) 103, 141; a coupler 106; an Eribuim-doped fiber amplifier (EDFA) 107; a dispersion-shifted fiber (DSF) 108; a band-pass filter (BPF) 109; an oscillator 110; and a polarization beam splitter (PBS) 144.

The laser diode (LD) 141 corresponds to a light emitting unit for outputting pumping light (Pump). The polarization controller (PC) 142 controls a polarization plane of input light. The phase modulator (PM) 143 phase-modulates the pumping light (Pump) based upon a modulation signal outputted from the oscillator 110, and then, outputs the phase-modulated pumping light. The polarization beam splitter (PBS) 144 splits input light to polarized waves which are orthogonal to each other, and multiplexes these polarized waves with each other. Other structural elements of this wavelength conversion apparatus are similar to those of FIG. 2. Both signal light and pumping light outputted from the laser diodes (LD) 103 and (LD) 141 penetrate the polarization controllers (PCs) 104 and 142, respectively, and then, are phase-modulated by the phase modulators (PMs) 105 and 143 based upon the modulation signal outputted from the oscillator 110. The light outputted from the phase modulator (PM) 105 and the light outputted from the phase modulator (PM) 143 are multiplexed with each other by the polarization beam splitter (PBS) 144 in such a manner that the polarized planes thereof are orthogonal with each other. Furthermore, the signal light traveled through the polarization controller (PC) 101 is multiplexed with the light outputted from the polarization beam splitter (PBS) 144. Subsequently, both the signal light and the pumping light, which have been multiplexed with each other, are amplified by the Erbium-doped fiber amplifier (EDFA) 107, and thereafter, the amplified signal and pumping light are processed by the dispersion-shifted fiber (DSF) 108 and the band-pass filter (BPF) 109, so that FWM light is outputted.

As indicated in the drawing, in accordance with the present invention, it is so assumed that the respective pumping light is phase-modulated based upon the frequency of "$\omega_m$," and the modulation index of "$m_p$" so as to suppress the SBS. In this case, assuming now that symbol "$\tau$" indicates a time delay between both the phase-modulated signals, the following formulae (23) and (24) are given:

$$\phi_{p1} = m_p \cos \omega_m t \quad (23)$$

$$\phi_{p2} = m_p \cos \omega_m (t-\tau) \quad (24)$$

In this case, symbols "$\phi_{p1}$" and "$\phi_{p2}$" represent a phase difference between a modulation signal of a first modulator and a modulation signal of a second modulator. In this case, assuming now that an initial value of an optical electric field of the signal light expressed in the formula (5) is equal to $\phi_s=0$, an optical electric field "$E_f$" of FWM light outputted from the BPF 109 after the DSF 108 may be expressed as:

$$E_f = kE_s^* E_{p1} E_{p2}$$
$$= kE_{s0}^* E_{p01} E_{p02} \exp j[(\omega_{p1}+\omega_{p2}-\omega_s)t+(\phi_{p1}+\phi_{p2})] \quad (25)$$

while symbol "K" is defined as a proportional constant. In this case, symbols "$E_{p1}$" and "$E_{p2}$" indicate optical electric fields of first and second pumping light, respectively. As a consequence, if the below-mentioned relationship can be satisfied, then the phase modulation component ($\phi_{p1}+\phi_{p2}$) of the electric field $E_f$ of the FWM light defined in the formula (25) can be canceled, so that broadening of the spectrum of the FWM light can be suppressed:

$$\omega_m \tau = (2n+1)\pi \text{ (n:integer)} \quad (26)$$

In this embodiment mode, the angular frequency "$\omega_{FWM}$" of the fourth light may be obtained as "$\omega_{ijk}$", assuming now that in the formula (3), for instance, symbol "$\omega_j$" is the angular frequency "$\omega_{p1}$" of the first pumping light; symbol "$\omega_j$" is the angular frequency "$\omega_{p2}$" of the second pumping light; and symbol "$\omega_k$" is the angular frequency "$\omega_s$" of the signal light. It should also be understood that plural sets of corresponding relationships other than this relationship may be conceived.

(9) Seventh Embodiment

Figure 15:
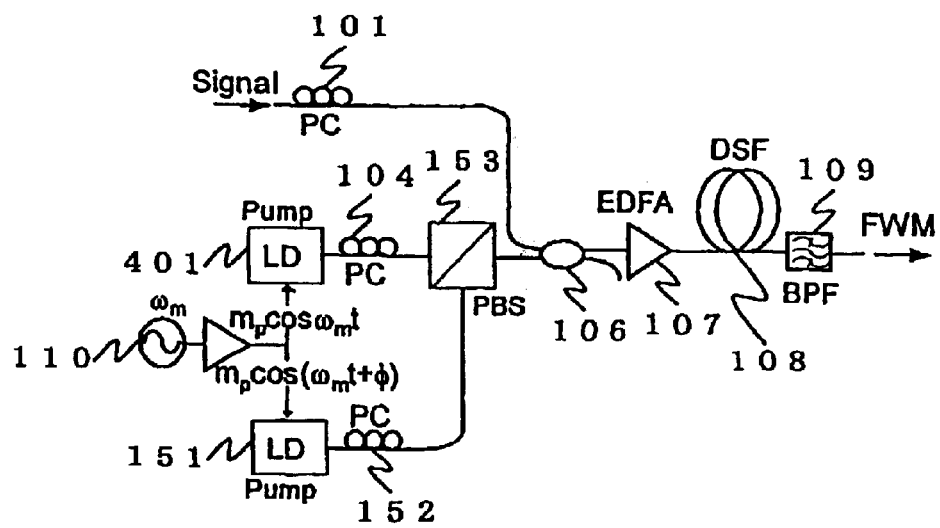
FIG. 15 is a structural diagram for representing that two sets of pumping light are frequency-modulated in the orthogonal polarization two-wavelength pumping system.

FIG. 15 is a structural diagram for indicating a wavelength conversion apparatus according to a seventh embodiment mode of the present invention. This drawing represents such an arrangement that both two sets of pumping light are frequency-modulated in the orthogonal polarization two-wavelength pumping system. Similar to the arrangement of the sixth embodiment mode, also in this arrangement, a wavelength conversion operation, which does not depend upon a polarized wave of signal light, may be realized in such a manner that polarized waves of pumping light having different wavelengths are entered into an optical fiber in such a manner that these polarized waves are orthogonal to each other by a polarization beam splitter (PBS) by employing two sets of pumping light. The wavelength conversion apparatus of this embodiment mode is provided with polarization controllers (PCs) 101, 104, 152; laser diodes (LDs) 401, 151; a coupler 106; an Eribuim-doped fiber amplifier (EDFA) 107; a dispersion-shifted fiber (DSF) 108; a bandpass filter (BPF) 109; an oscillator 110; and a polarization beam splitter (PBS) 153.

The laser diode (LD) 151 corresponds to a light emitting unit for frequency-modulating pumping light based upon a modulation signal outputted from the oscillator 110 to output the frequency-modulated pumping light. The polarization controller (PC) 152 splits and multiplexes a polarization plane of input lint. Other structural elements of this wavelength conversion apparatus are similar to those of FIG. 4.

The pumping light is directly frequency-modulated by the laser diodes (LDs) 401 and 151 based upon the modulation signal outputted from the oscillator 110, and then, the frequency-modulated pumping light passes through the polarization controllers (PCs) 104 and 152. The light outputted from the phase modulator (PM) 105 and the light outputted from the phase modulator (PM) 143 are multiplexed with each other by the polarization beam splitter (PBS) 144 in such a manner that the polarized planes thereof are orthogonal with each other. Furthermore, the signal light traveled through the polarization controller (PC) 101 is multiplexed with the light outputted from the polarization beam splitter (PBS) 144. Subsequently, both the signal light and the pumping light, which have been multiplexed with each other, are amplified by the Erbium-doped fiber amplifier (EDFA) 107, and thereafter, the amplified signal and pumping light is processed by the dispersion-shifted fiber (DSF) 108 and the band-pass filter (BPF) 109, so that FWM light is outputted.

Assuming now that the initial value of the electric field of the signal light in the formula (5) is defined as $\phi_s=0$, an electric field of the FWM light becomes similar to the formula (25). Assuming that maximum frequency deviation is set to "B", frequency changes in the pumping light at this time may be expressed as:

$$d\phi_{p1}/dt = \pi B \cos \omega_m t \quad (27)$$

$$d\phi_{p2}/dt = \pi B \cos \omega_m (t-\tau) \quad (28).$$

As a consequence, since these frequency changes are given by the following formulae (29) and (30), similar to the sixth embodiment mode, if the below-mentioned relationship can be satisfied, then the phase modulation component defined in the formula (25) can be canceled, so that broadening of the spectrum of the FWM light can be suppressed:

$$\phi_{p1} = (\pi B/\omega_m)\sin \omega_m t + const \quad (29)$$

$$\phi_{p2} = (\pi B/\omega_m)\sin \omega_m (t-\tau) + const \quad (30).$$

In this embodiment mode, the angular frequency "$\omega_{FWM}$" of the fourth light may be obtained as "$\omega_{ijk}$", assuming now that in the formula (3), for instance, symbol "$\omega_i$" is the angular frequency "$\omega_{p2}$" of the first pumping light; symbol "$\omega_j$" is the angular frequency "$\omega^{p2}$" of the second pumping light; and symbol "$\omega_k$" is the angular frequency "$\omega_s$" of the signal light. It should also be understood that plural sets of corresponding relationships other than this relationship may be conceived.

INDUSTRIAL APPLICABILITY

As previously described, according to the present invention, the wavelength conversion apparatus having the high conversion efficiency with employment of the optical fiber can be provided. More specifically, in accordance with the present invention, while the SBS phenomenon is suppressed by phase-modulating, or frequency-modulating the pumping light, the signal light is also phase-modulated based upon the same frequency, so that the FWM light having less broadening of the spectrum.

Although embodiments of the invention have been shown and described, it is to be understood that various modifications and substitutions, as well as rearrangements of method steps and equipment, can be made by those skilled in the art without departing from the novel spirit and scope of the invention.

What is claimed is:

1. A wavelength conversion apparatus, comprising:

an oscillator for outputting a modulation signal;

a first modulator for inputting thereinto signal light, and for modulating the signal light by the modulation signal outputted from said oscillator;

a second modulator for modulating inputted pumping light in synchronization with the signal light by the modulation signal outputted from said oscillator and modulates the signal light;

a multiplexer for multiplexing the output from said first modulator with the output from said second modulator; and an optical fiber for inputting thereinto the output of said multiplexer, and for outputting an optical signal, the wavelength of which is converted by a degenerate four-wave mixing operation.

2. A wavelength conversion apparatus according to claim 1 wherein:

said modulation signal satisfies the following condition:

$$2m_p = m_s$$

$$\omega_m \tau = 2n\pi$$

where $m_p$: a modulation index of the pumping light, $m_s$: a modulation index of the signal light, $\omega_m$: a modulation angular frequency, $\tau$: a time delay between both phase-modulated signals, n: an integer.

3. A wavelength conversion apparatus, comprising:

an oscillator for outputting a modulation signal;

a first modulator for inputting thereinto pumping light, and for modulating the pumping light by the modulation signal outputted from said oscillator, a multiplexer for multiplexing the output from said first modulator and signal light;

an optical fiber for inputting thereinto the output of said multiplexer, and for outputting an optical signal, the wavelength of which is converted by a degenerate four-wave mixing operation; and a second modulator for modulating the degenerate four-wave-mixed light outputted from said optical fiber in synchronization with the pumping light by said modulation signal which is outputted from said oscillator and modulates the pumping light.

4. A wavelength conversion apparatus according to claim 3 wherein:

said modulation signal satisfies the following condition:

$$m_p = m_s$$

$$\omega_m \tau = 2n\pi - \phi$$

where
- $m_p$: a modulation index of the pumping light,
- $m_s$: a modulation index of the signal light,
- $\omega_m$: a modulation angular frequency,
- $\tau$: a time delay between both phase-modulated signals,
- n: an integer,
- $\phi$: a phase difference between the modulation signals of said first modulator.

5. A wavelength conversion apparatus, comprising:
   an oscillator for outputting a modulation signal;
   a modulator for inputting thereinto signal light, and for modulating the signal light by the modulation signal outputted from said oscillator;
   a light emitting unit for outputting pumping light which is modulated in synchronization with the signal light by the modulation signal which is outputted from said oscillator and modulates the signal light;
   a multiplexer for multiplexing the output from said modulator and the output from said light emitting unit; and
   an optical fiber for inputting thereinto the output of said multiplexer, and for outputting an optical signal, the wavelength of which is converted by a degenerate four-wave mixing operation.

6. A wavelength conversion apparatus according to claim 5 wherein:
   said modulation signal satisfies the following condition:

$$2\pi B/\omega_m = m_s$$

$$\omega_m \tau = (2n+1/2)\pi$$

where
- B: maximum frequency deviation of the pumping light,
- $\omega_m$: a modulation angular frequency,
- $m_s$: a modulation index of the signal light,
- $\tau$: a time delay between both phase-modulated signals,
- n: an integer.

7. A wavelength conversion apparatus, comprising:
   an oscillator for outputting a modulation signal along a second direction, which is inputted along a first direction;
   a reflector for reflecting thereon signal light;
   a multiplexer for multiplexing pumping light and the signal light reflected from said reflector,
   a modulator for inputting thereinto the signal light along the first direction and modulating the signal light based by the modulation signal outputted from said oscillator, and for inputting thereinto the mulitplexed light from said multiplexer along the second direction and modulating the pumping light and signal light modulated along the second direction in synchronization with the signal light long the first direction by said modulation signal outputted which is outputted from said oscillator and modulates the signal long the first direction; and
   an optical fiber for inputting thereinto the output of said modulator, and for outputting an optical signal, the wavelength of which is converted by a degenerate four-wave mixing operation.

8. A wavelength conversion apparatus according to claim 7 wherein:
   said modulation signal satisfies the following condition:

$$\omega_m \tau = n\pi$$

where
- $\omega_m$: a modulation angular frequency,
- $\tau$: a time delay between the phase modulator and a mirror,
- n: an integer.

9. A wavelength conversion apparatus, comprising:
   an oscillator for outputting a modulation signal;
   a polarization beam splitter for splitting inputted signal light into a first polarized wave and a second polarized wave, the polarized planes of which are orthogonal to the other, and for multiplexing an entered third polarized wave and an inputted fourth polarized wave;
   a modulator for inputting thereinto said first polarized wave from said polarization beam splitter and modulating said first polarized wave by the modulation signal outputted from said oscillator so as to output the modulated first polarized wave as the third polarized wave, and for inputting the second polarized wave derived from said polarization beam splitter along a direction opposite to that of said first polarized wave and modulating said second polarized wave in synchronization with said third polarized wave by said modulation signal which is outputted from said oscillator and modulates said third polarized wave so as to output the modulated second polarized wave as the fourth polarized wave;
   a 90-degree twisting unit for twisting by 90 degrees a polarization plane of said first polarized wave from said polarization beam splitter and a polarization plane of said fourth polarized wave from said modulator, and
   a polarization independent optical fiber four-wave mixing element for inputting thereinto the output from said polarization beam splitter, and for outputting a polarization independent optical signal, the wavelength of which is converted.

10. A wavelength conversion apparatus according to claim 1, further comprising:
    a polarization controller at a prestage of an input of said optical fiber, said first modulator, or said second modulator.

11. A wavelength conversion apparatus according to claim 2, further comprising:
    a polarization controller at a prestage of an input of said optical fiber, said first modulator, or said second modulator.

12. A wavelength conversion apparatus according to claim 3, further comprising:
    a polarization controller at a prestage of an input of said optical fiber, said first modulator, or said second modulator.

13. A wavelength conversion apparatus according to claim 4, further comprising:
    a polarization controller at a prestage of an input of said optical fiber, said first modulator, or said second modulator.

14. A wavelength conversion apparatus according to claim 5, further comprising:
   a polarization controller at a prestage of an input of said optical fiber, said first modulator, or said second modulator.

15. A wavelength conversion apparatus according to claim 6, further comprising:
   a polarization controller at a prestage of an input of said optical fiber, said first modulator, or said second modulator.

16. A wavelength conversion apparatus according to claim 7, further comprising:
   a polarization controller at a prestage of an input of said optical fiber, said first modulator, or said second modulator.

17. A wavelength conversion apparatus according to claim 8, further comprising:
   a polarization controller at a prestage of an input of said optical fiber, said first modulator, or said second modulator.

18. A wavelength conversion apparatus according to claim 9, further comprising:
   a polarization controller at a prestage of an input of said optical fiber, said first modulator, or said second modulator.

* * * * *